United States Patent
Santhanam et al.

(10) Patent No.: US 12,205,408 B1
(45) Date of Patent: Jan. 21, 2025

(54) DETECTING INTERACTIONS WITH INVENTORY LOCATIONS

(71) Applicant: Amazon Technologies, Inc., Seattle, WA (US)

(72) Inventors: Venkataraman Santhanam, Marlborough, MA (US); Ejaz Ahmed, Marlborough, MA (US); Gregory Hager, Baltimore, MD (US)

(73) Assignee: Amazon Technologies, Inc., Seattle, WA (US)

( * ) Notice: Subject to any disclaimer, the term of this patent is extended or adjusted under 35 U.S.C. 154(b) by 905 days.

(21) Appl. No.: 17/335,595

(22) Filed: Jun. 1, 2021

(51) Int. Cl.
| | | |
|---|---|---|
| G06V 40/20 | (2022.01) |
| G06F 18/214 | (2023.01) |
| G06Q 10/087 | (2023.01) |
| G06V 20/52 | (2022.01) |
| G06V 40/10 | (2022.01) |

(52) U.S. Cl.
CPC ........... G06V 40/28 (2022.01); G06Q 10/087 (2013.01); G06V 20/52 (2022.01); G06V 40/107 (2022.01); G06F 18/214 (2023.01)

(58) Field of Classification Search
CPC ...... G06V 20/52; G06V 40/28; G06V 40/107; G06Q 10/087; G06F 18/214
See application file for complete search history.

(56) References Cited

U.S. PATENT DOCUMENTS

| | | | |
|---|---|---|---|
| 7,693,758 B1 * | 4/2010 | Bacco .................. | G06Q 20/203 705/28 |
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 10,242,393 B1 * | 3/2019 | Kumar ............... | G06Q 30/0633 |
| 11,087,271 B1 * | 8/2021 | Guan .................. | G06Q 10/087 |
| 11,093,785 B1 * | 8/2021 | Siddiquie ............. | G06Q 10/087 |
| 11,301,684 B1 * | 4/2022 | Kumar .................. | G06V 20/41 |
| 11,869,065 B1 * | 1/2024 | Eledath ................. | G06V 40/28 |

(Continued)

OTHER PUBLICATIONS

Liu et al., "Customer behavior classification using surveillance camera for marketing", Multimed Tools Appl 76, 6595-6622. (Year: 2017).*

(Continued)

*Primary Examiner* — Ping Y Hsieh
*Assistant Examiner* — Jose M Torres
(74) *Attorney, Agent, or Firm* — Lee & Hayes, P.C.

(57) ABSTRACT

This disclosure describes, in part, techniques for identifying interactions and events associated with inventory locations. For instance, system(s) may receive image data representing a user interacting with an inventory location. The system(s) may then generate heatmap data indicating a first portion of the image data that represents the inventory location and feature data indicating a second portion of the image data that represents the user. Next, the system(s) may analyze the heatmap data with respect to the feature data to determine that the second portion of the image data corresponds to the first portion of the image data. As such, the system(s) may determine that the user is interacting with the inventory location. Based on the determination, the system(s) may analyze the first portion of the image data to identify an event that occurs at the inventory location, such as the user removing an item.

21 Claims, 9 Drawing Sheets

(56) References Cited

U.S. PATENT DOCUMENTS

| | | | |
|---|---|---|---|
| 2013/0076898 A1* | 3/2013 | Philippe | G16H 40/20 |
| | | | 348/143 |
| 2013/0284806 A1 | 10/2013 | Margalit | |
| 2016/0203499 A1* | 7/2016 | Yamashita | G06V 20/52 |
| | | | 705/7.29 |
| 2018/0165733 A1* | 6/2018 | Kundu | G06Q 30/0609 |
| 2019/0138986 A1* | 5/2019 | Puerini | G06Q 10/0875 |
| 2019/0156277 A1* | 5/2019 | Fisher | G06N 3/08 |
| 2020/0272982 A1* | 8/2020 | Gabbai | G06Q 10/04 |
| 2021/0158430 A1* | 5/2021 | Buibas | H04B 3/02 |

OTHER PUBLICATIONS

Morris et al., "Inventory Management of the Refrigerator's Produce Bins Using Classification Algorithms and Hand Analysis", SoutheastCon 2021, Atlanta, Ga, USA, 2021, pp. 1-8 (Year: 2021).*

* cited by examiner

DETECTING INTERACTIONS WITH INVENTORY LOCATIONS

BACKGROUND

Retailers, wholesalers, and other product distributors typically maintain an inventory of various items that may be ordered, purchased, leased, rented, viewed, and/or so forth by customers. For example, a physical store may maintain an inventory of items in customer accessible areas, such as in a shopping area, and customers may pick items from the inventory and take them to a cashier for purchase, lease, and/or so forth. In some instances, the customers may take items from a table that includes bins, where each bin is for holding a specific type of item. For example, a table that maintains fruit may include a different bin for each type of fruit, such as oranges, bananas, and/or the like. As such, when a customer is rummaging through such a table to remove items, it may be desirable to determine the bins for which the customer removed the items.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
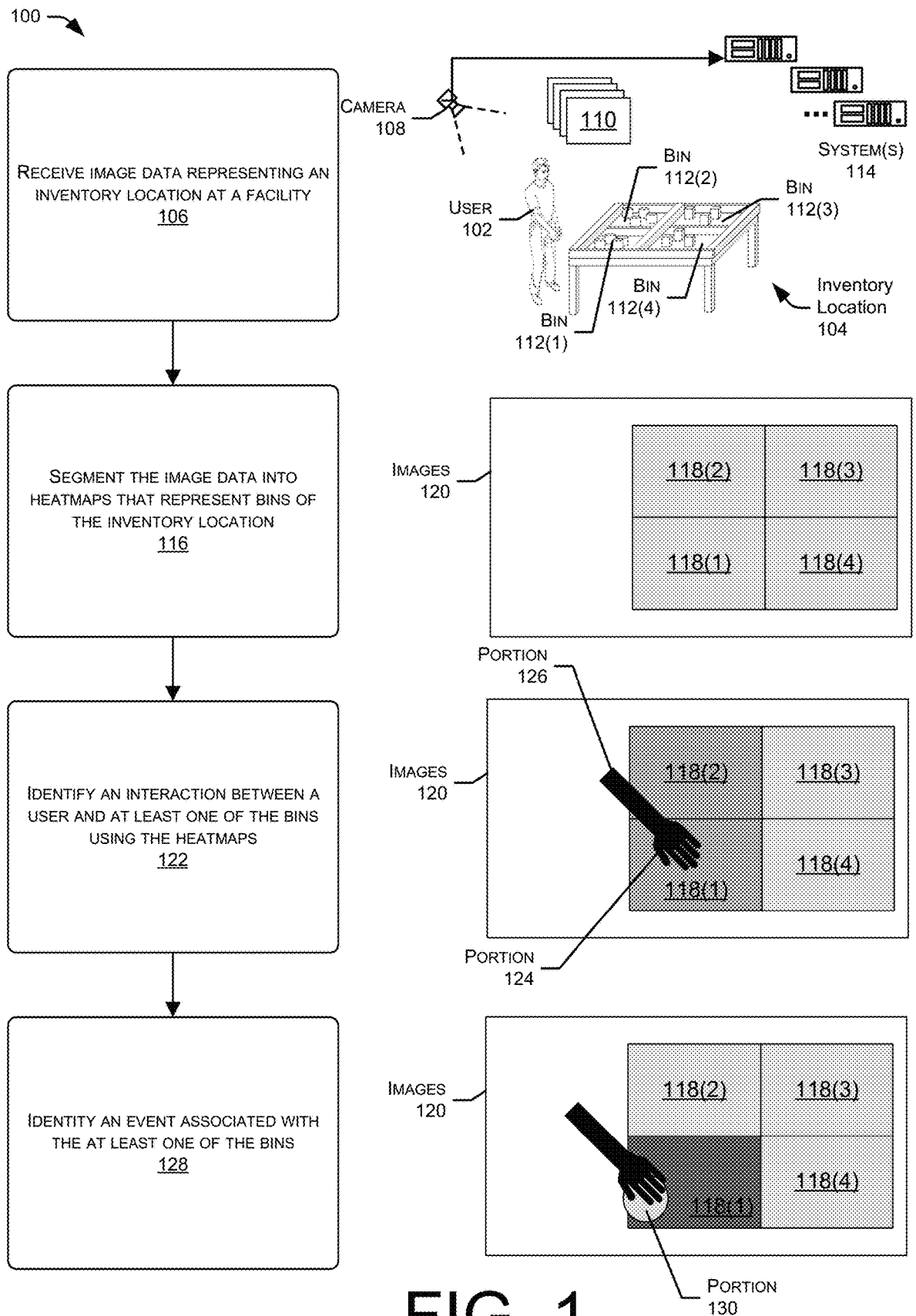
FIG. 1 illustrates an example process for determining that a user is interacting with an inventory location, in accordance with examples of the present disclosure.

This disclosure describes, in part, techniques for using image data to detect interactions that occur with inventory locations. For instance, system(s) may receive image data generated by a camera located at a facility, where the image data represents an interaction between a user and an item located at an inventory location. The system(s) may then use one or more components to analyze the image data in order to identify the interaction. For example, to analyze the image data, the system(s) may determine first portions (e.g., first pixels) of the image data that correspond to different inventory locations (e.g., bins) as well as second portions (e.g., second pixels) of the image data that correspond to portion(s) (e.g., a hand, arm, etc.) of the user. The system(s) may then determine that the user is interacting with the inventory location by determining that the second portions of the image data correspond to (e.g., overlap, match, intersect, etc.) the first portions of the image data that represent the inventory location. Additionally, the system(s) may then analyze the first portions of the image data that represent the inventory location in order to detect an event, such as the user removing an item from or returning an item to the inventory location. Based on detecting the event, the system(s) may generate event data associated with the event.

For more detail, the system(s) may initially train the component(s) to detect interactions and/or events. To train the component(s), the system(s) may use image data representing both interactions with inventory locations as well as events that occur at the inventory locations. As described herein, an interaction may include a portion of a user being located over and/or proximate to the inventory location, such as when the user is searching for items maintained at the inventory location and/or maintained at a neighboring inventory location. Additionally, an event may include, but is not limited to, a user removing an item from an inventory location, a user returning an item to the inventory location, a user searching for an item at the inventory location without removing or returning an item (e.g., the user rummaging through the items at the inventory location), and/or any other contact that a user may have with items at an inventory location. Finally, an inventory location may include, but is not limited to, a shelf, a table, a bin (e.g., a bin located on a table), a tote (e.g., a shopping cart), a freezer, a refrigerator, and/or any other object that is capable of maintaining items.

In some examples, to train the component(s), the system(s) may process the image data by removing the underlying appearance of the inventory location and the user from the image data. In some examples, the system(s) remove the underlying appearance of the inventory location using a heatmap to represent the inventory location (e.g., the portion of the inventory location that maintains the items). As described herein, a heatmap may include, but is not limited to, a planogram, a shape (e.g., a circle, a polygon, etc.), and/or the like that represents at least a portion of the inventory location. Additionally, the system(s) remove the underlying appearance of the user by using body part segmentation to segment the user, such as to segment the arm and hand of the user. The system(s) may then generate feature data indicating at least a first portion of the image data that represents the heatmap and a second portion of the image data that represents portion(s) of the user, such as the arm and hand of the user. In some examples, the feature data includes processed image data representing at least the heatmap and the portion(s) of the user.

The system(s) may then input the feature data into the component(s) in order to train the component(s). For example, based on inputting the feature data, the component(s) may output data representing whether the user interacted with the inventory location and/or an event that occurred with the inventory location. The system(s) may then analyze the data in order to determine whether the component(s) were correct or incorrect. Additionally, the system(s) may adjust one or more parameters that the component(s) use to identify interactions and/or events based on whether the output was correct or incorrect.

The system(s) may then use the component(s) to detect interactions and/or events that occur at a facility. For example, to detect an interaction, the system(s) may receive image data generated by a camera, where the image data represents a user interacting with inventory location(s) at the facility. The system(s) may then process the image data in order to identify portions (referred to, in some examples, as "first portions") of the image data that represent the inventory location(s). In some examples, the system(s) generate heatmap data indicating these first portions of the image data that represent the inventory location(s). Additionally, the system(s) may process the image data in order to identify portions (referred to, in some examples, as "second portions") of the image data that represent specific portions of the user, such as the hand(s) and/or arm(s) of the user. In some examples, the system(s) generate feature data indicating these second portions of the image data. The system(s) may then analyze this heatmap data and feature data using the component(s).

For example, the component(s) may analyze the feature data with respect to the heatmap data in order to determine that the second portions of the image data representing the portions of the user correspond to the first portions of the image data representing the inventory location. In some examples, the second portions of the image data correspond to the first portions of the image data when the pixels associated with the second portions of the image data overlap, match, and/or intersect with the pixels associated with the first portions of the image data. Based on determining that the second portions of the image data correspond to the first portions of the image data, the component(s) may identify an interaction between the user and the inventory location. In some examples, and based on the interaction, the component(s) may then determine that the inventory location includes an "active" inventory location.

The component(s) may perform similar processes in order to identify additional interaction(s) between the user and additional inventory location(s). For example, if the inventory locations correspond to bins located on a table, the component(s) may perform similar processes in order to determine that the user is interacting with multiple bins (e.g., the portions of the user are located over the bins). The component(s) may then determine that each of these inventory locations include a respective "active" inventory location. Additionally, if the image data represents more than one user, the system(s) and/or component(s) may perform these processes in order to identify interactions between each of the users and the inventory locations represented by the image data.

The component(s) may then analyze the first portions of the image data representing the active inventory location(s) in order to identify event(s) that occur at the inventory location(s). For example, and for an active inventory location, the component(s) may analyze the first portion of the image data representing the inventory location in order to determine that a user removed an item from the inventory location, returned an item to the inventory location, searched for an item at the inventory location without removing or returning an item (e.g., the user rummaged through the items at the inventory location), and/or any other type of interaction that a user may have with items at an inventory location.

In some examples, the system(s) may then generate event data representing the interaction with the inventory location, the event that occurred at the inventory location (e.g., removing item(s), returning item(s), rummaging, etc.), the period of time that the interaction and/or event occurred, a location of the event (e.g., a location of the inventory location), an identity of the user, and/or any other information associated with the interaction and/or the event.

In some examples, such as when an event occurs, the system(s) may determine an item type associated with the item(s). For a first example, the system(s) may store inventory data that associates inventory locations with different item types. For instance, the inventory data may indicate that a first inventory location (e.g., a first bin) maintains a first item type (e.g., oranges), a second inventory location (e.g., a second bin) maintains a second item type (e.g., bananas), a third inventory location (e.g., a third bin) maintains a third item type (e.g., pears), and/or so forth. The system(s) may then use the inventory data to determine the item type that is associated with the event. For instance, and using the example above, if the system(s) determine that the event includes a user removing item(s) from the first inventory location, then the system(s) may determine that the user removed orange(s) from the first inventory location. The system(s) may then generate the event data to further represent the item type.

For a second example, the system(s) may store inventory data that associates heatmaps with different item types. For instance, the inventory data may indicate that a first heatmap is associated with a first item type (e.g., oranges), a second heatmap is associated with a second item type (e.g., bananas), a third heatmap is associated with a third item type (e.g., pears), and/or so forth. The system(s) may then use the inventory data to determine the item type that is associated with the event. For instance, and using the example above, if the system(s) determine that the event includes a user removing item(s), where the event is associated with the user interacting with the first heatmap, then the system(s) may determine that the user removed orange(s). The system(s) may then generate the event data to further represent the item type.

In some examples, the system(s) may also determine the number of items removed from and/or returned to the inventory location. For a first example, the component(s) may analyze the image data in order to determine the number of items. For a second example, the system(s) may analyze sensor data generated by one or more other sensors associated with the inventory location and/or another feature of the facility (e.g., a tote, a weight scale, etc.). Based on the analysis, the system(s) may determine the number of items. For example, if the sensor(s) include weight sensor(s), the system(s) may analyze the sensor data in order to determine the weight of the item(s) removed from and/or returned to the inventory location. The system(s) may then determine the number of items based on the weight (e.g., divide the weight by the weight per item). While these are just a couple example techniques of how the system(s) may determine the number of items, in other examples, the system(s) may use additional and/or alternative techniques to determine the number of items. Additionally, in some example, the system(s) may generate the event data to further represent the number of items.

In some examples, the system(s) may then associate the event with the user. However, in other examples, the system(s) may perform additional processing in order to determine that the event is associated with the user. For example, if the system(s) cannot initially determine the identity of the user that is associated with the event, the system(s) may determine that the item(s) associated with the event are currently "in-flight" (e.g., the system(s) need to identify the user that removed the item(s)). The system(s) may then analyze sensor data from one or more other sensors to determine that the item(s) are associated with the user (e.g., that the user removed and/or possesses the item(s)).

For a first example, the system(s) may receive sensor data from sensor(s) associated with a tote of a user. The system(s) may then analyze the sensor data in order to determine that the item(s) were placed in the tote by the user. As such, the system(s) may associate the event with the user. For a second example, the system(s) may receive sensor data from sensor(s) associated with a weight scale that weighs items. The system(s) may then analyze the sensor data in order to determine that the item(s) were placed on the weight scale by the user. As such, the system(s) may associate the event with the user. While these are just a couple example techniques of how the system(s) may use additional sensor data to determine that the event is associated with the user, in other examples, the system(s) may perform additional and/or alternative techniques to determine that the event is associated with the user.

In some examples, the system(s) may then use the event data in order to update a state of a virtual cart associated with the user. For a first example, based on determining that the user is associated with the event, where the event includes removing item(s), the system(s) may update the virtual cart to indicate the addition of the item and/or the addition of the number of items. For a second example, based on determining that the user is associated with the event, where the event includes returning item(s), the system(s) may update the virtual cart to indicate the removal of the item and/or the removal of the number of items. The system(s) may then use the virtual cart of the user in order to process a transaction for item(s) added to the virtual cart, such as when the user exits the facility.

While the examples above describe using a heatmap to represent at least an entirety of an area of an inventory location that is configured to maintain items (e.g., an entire shelf, an entire opening to a bin, etc.), in other examples, the system(s) generate a heatmap to represent items still located at the inventory location. For example, only a portion of the area of the inventory location may actually be maintaining items. For instance, after multiple users have rummaged through the items associated with the inventory locations, some items may have been removed from the inventory location and/or some items may have been moved to different locations on the inventory location (e.g., the inventory location is "untidy"). As such, instead of representing the entire area of the inventory location using a heatmap, the system(s) may generate the heatmap to only represent the portion of the area that still maintains items. This way, the system(s) are able to determine when users are interacting with "important" portions of the inventory location, such as the portions that still maintain items.

In such an example, the heatmap may represent the probabilities of items being located at different locations of the inventory location. For example, if the system(s) determine that there is a 95% probability that item(s) are located at a first area of an inventory location, a 50% probability that item(s) are located at a second area of the inventory location, and a 25% probability that item(s) are located at a third area of the inventory location, then the system(s) may generate the heatmap to represent those probabilities. For example, the system(s) may generate the heatmap such that the heatmap includes different characteristics (e.g., colors, shadings, etc.) for the different areas of the inventory location, where each characteristic is associated with a respective probability (e.g., darker colors may represent higher probabilities while lighter colors represent lower probabilities). Additionally, the system(s) may continue to update the heatmap as the items on the inventory location are removed, returned, or moved to different locations.

Furthermore, in some examples, the system(s) may generate more than one heatmap for a single inventory location. For example, the inventory location may include a first type of item (e.g., bananas) and a second type of item (e.g., oranges). As such, the system(s) may determine first area(s) of the inventory location that include the first type of item and second area(s) of the inventory location that include the second type of item. The system(s) may then generate a first heatmap for the first type of item, where the first heatmap is associated with the first area(s), and generate a second heatmap for the second type of item, where the second heatmap is associated with the second area(s). Additionally, and similar to the examples above, the system(s) may continue to update the heatmaps as the items on the inventory location are removed, returned, and/or moved to different locations.

Additionally, while the examples above describe the inventory locations as including shelves, tables, bins, and/or the like, in other examples, similar processes may be performed to identify interactions and/or events associated with other types of inventory locations. For example, the system(s) may receive image data representing a user interacting with a tote, such as a shopping cart. The system(s) may then generate heatmap data representing the tote (e.g., the top frame of the shopping cart). Additionally, the system(s) may process the image data in order to generate feature data representing portion(s) of the user. The system(s) may then analyze the heatmap data with respect to the feature data in order to determine that a first portion of the image data that represents the portion(s) of the user corresponds with a second portion of the image data that represents the tote. Based on the determination, the system(s) may determine that the user is interacting with the tote. Additionally, in some examples, the system(s) may then analyze the second portion of the image data that represents the tote in order to identify an event, such as the user removing an item from the tote, the user placing an item in the tote, the user rummaging through the item(s) within the tote, and/or any other event. The system(s) may then generate event data representing the event.

In some examples, by training the component(s) using the processes described herein, the system(s) may use these same component(s) to process image data representing different inventory locations, either located at the facility or other facilities. For example, the component(s) may be trained such that the component(s) are able to identify interactions and/or events that occur with different types of inventory locations, such as tables, bins, shelves, and/or the like. When analyzing image data representing an inventory location, the component(s) may thus be trained to automatically generate the heatmap representing the inventory location and then use the heatmap to identify interactions and/or events that occur at the inventory location.

FIG. 1 illustrates an example process 100 for determining that a user 102 is interacting with an inventory location 104, in accordance with examples of the present disclosure. At 106, the process 100 may include receiving image data representing an inventory location at a facility. For instance, the facility may include a camera 108 that is configured to generate image data 110 representing at least the inventory location 104. In the example of FIG. 1, the inventory location 104 includes a number of bins 112(1)-(4) (also referred to as "bins 112"), where each bin 112 maintains a specific type of item. In some examples, each bin 112 may include its own inventory location. System(s) 114 may then receive the image data 110 from the camera 108.

At 116, the process 100 may include segmenting the image data into heatmaps that represent bins of the inventory location. For instance, the system(s) 114 may segment the image data 110 into heatmaps 118(1)-(4) (also referred to as "heatmaps 118") that represent the bins 112. For example, and in the example of FIG. 1, the first heatmap 118(1) may represent the first bin 112(1), the second heatmap 118(2) may represent the second bin 112(2), the third heatmap 118(3) may represent the third bin 112(3), and the fourth heatmap 118(4) may represent the fourth bin 112(4) of the inventory location 104. In some examples, the system(s) 114 (e.g., the component(s) described herein) segment the image data 110 by analyzing images 120 represented by the image data 110 in order to identify the bins 112. The system(s) 114 may then generate heatmaps 118 for the bins 112. Additionally, or alternatively, in some examples, the system(s) 114 segment the image data 110 using input data received from one or more devices. For example, the input data may represent the portions of the images 120 that represent the bins 112 and/or the locations for the heatmaps 118.

In some examples, the system(s) 114 (e.g., the component(s) described herein) may generate data (referred to, in some examples, as "heatmap data") representing the heatmaps 118. For example, the heatmap data may indicate that a first portion (e.g., first pixels) of the image data 110 represents the first heatmap 118(1), a second portion (e.g., second pixels) of the image data 110 represents the second heatmap 118(2), a third portion (e.g., third pixels) of the image data 110 represents the third heatmap 118(3), and a fourth portion (e.g., fourth pixels) of the image data 110 represents the fourth heatmap 118(4).

At 122, the process 100 may include identifying an interaction between a user and at least one of the bins using the heatmaps. For instance, the system(s) 114 (e.g., the component(s) described herein) may determine that the image data 110 represents the user 102. The system(s) 114 may then process the image data 110 using body part segmentation associated with the user 102. For example, the system(s) 114 may determine at least that a fifth portion 124 (e.g., fifth pixels) of the image data 110 represents a hand and/or a sixth portion 126 (e.g., sixth pixels) of the image data 110 represents an arm. In some examples, system(s) 114 may then generate data (referred to, in some examples, as "features data") indicating that the fifth portion 124 of the image data 110 represent the hand and/or that the sixth portion 126 of the image data 110 represents the arm. In some examples, the features data indicates the portions of the image data 110 by representing coordinates (e.g., u,v coordinates) of the images 120 for which the hand and/or the arm are located.

The system(s) 114 (e.g., the component(s) described herein) may then identify the interaction(s) between the user 102 and the bins 112 using the heatmaps 118 and the segmentation (e.g., using the heatmap data and the features data). For example, the system(s) 114 may determine that the fifth portion 124 of the image data 110 corresponds to (e.g., overlaps, matches, intersects, etc.) the first portion of the image data 110. Based on the determination, the system(s) 114 may identify a first interaction between the user 102 and the first bin 112(1). Additionally, the system(s) 114 may determine that the sixth portion 126 of the image data 110 corresponds to (e.g., overlaps, matches, intersects, etc.) the second portion of the image data 110. Based on the determination, the system(s) 114 may identify a second interaction between the user 102 and the second bin 112(2). In some examples, based on identifying the interactions, the system(s) 114 may then determine that the first bin 112(1) and the second bin 112(2) include active bins 112. This may be illustrated by the example of FIG. 1, which illustrates the first heatmap 118(1) and the second heatmap 118(2) including a different characteristic (e.g., color, shading, pattern, etc.) than the third heatmap 118(3) and the fourth heatmap 118(4).

At 128, the process 100 may include identifying an event associated with the at least one of the bins. For instance, based on the first bin 112(1) and the second bin 112(2) including active bins 112, the system(s) 114 may analyze the first portion of the image data 110 and the second portion of the image data 110 in order to identifying events associated with the first bin 112(1) and the second bin 112(2). For example, and in the example of FIG. 1, the system(s) 114 may analyze at least the first portion of the image data 110 in order to determine that the first portion of the image data 110 represents the hand in possession of an item, where the item is represented by a seventh portion 130 of the image data 110. Additionally, in some examples, the system(s) 114 may further analyze at least the first portion of the image data 110 to determine that the image data 110 represents the hand removing the item from the first bin 112(1). As such, the system(s) 114 may determine that a first event occurred, where the first event includes the user 102 removing the item from the first bin 112(1).

Additionally, the system(s) may analyze the second portion of the image data 110 in order to determine that the second portion of the image data 110 represents the arm of located over the second bin 112(2). However, unlike the first event, the system(s) 114 may determine that the user 102 does not remove an item from and/or return an item to the second bin 112(2). As such, the system(s) 114 may determine that a second event associated with the second bin 112(2) did not occur. These events may be illustrated by the example of FIG. 1, which illustrates the first heatmap 118(1) including a different characteristic than the second heatmap 118(2), the third heatmap 118(3), and the fourth heatmap 118(4). In some examples, the system(s) 114 may then generate event data representing at least the first event. For instance, the event data may represent the event type (e.g., removing an item.) the period of time that the interaction and/or event occurred, a location of the event (e.g., the first bin 112(1)), an identity of the user 102, and/or the like.

In some examples, the system(s) 114 may also identify the item type associated with the removed item. For a first example, the system(s) 114 may store inventory data indicating that the first bin 112(1) maintains a first item type (e.g., oranges), the second bin 112(2) maintains a second item type (e.g., bananas), the third bin 112(3) maintains a third item type (e.g., pears), and the fourth bin 112(4) maintains a fourth item type (e.g., peaches). For a second example, the system(s) 114 may store inventory data indicating that the first heatmap 118(1) is associated with the first item type (e.g., oranges), the second heatmap 118(2) is associated with the second item type (e.g., bananas), the third heatmap 118(3) is associated with the third item type (e.g., pears), and the fourth heatmap 118(4) is associated with the fourth item type (e.g., peaches). As such, since the system(s) 114 determined that the first event includes the user 102 removing the item from the first bin 112(1), the system(s) 114 may determine that the item type that was removed by the user 102 includes the first item type (e.g., an orange). Additionally, in some examples, the system(s) 114 may generate the event data to further represent the item type.

Figure 2:
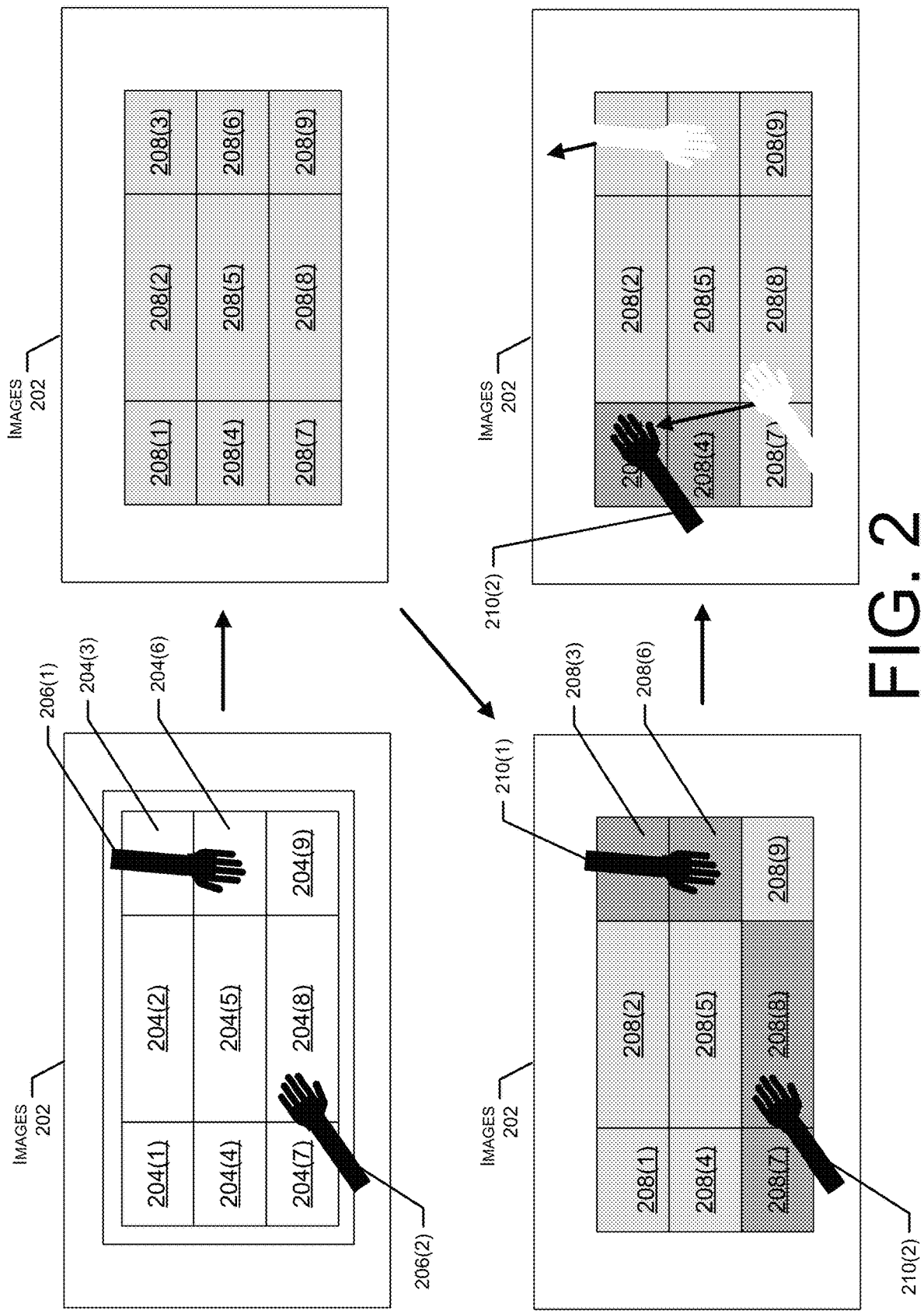
FIG. 2 illustrates an example of identifying interactions and events associated with inventory locations, in accordance with examples of the present disclosure.

FIG. 2 illustrates an example of identifying interactions associated with inventory locations, in accordance with examples of the present disclosure. As shown by the top-left illustration, the system(s) 114 may originally receive image data representing images 202 depicting inventory locations 204(1)-(9) (also referred to as "inventory locations 204"). In some examples, the inventory locations 204 include bins located on another inventory location, such as a table. In some examples, each of the inventory locations 204 maintains a respective item type. For example, each of the inventory locations 204 may maintain a respective type of fruit, where users 206(1)-(2) (also referred to as "users 206") at the facility are able to search through the inventory locations 204 when removing and/or returning fruit. As such, the system(s) 114 may analyze the image data in order to detect interactions between the users 206 and the inventory locations 204.

For instance, and as shown by the top-right illustration, the system(s) 114 may generate heatmaps 208(1)-(9) (also referred to as "heatmaps 208") that represent the inventory locations 204. For example, and in the example of FIG. 2, the first heatmap 208(1) may represent the first inventory location 204(1), the second heatmap 208(2) may represent the second inventory location 204(2), the third heatmap 208(3) may represent the third inventory location 204(3), and the fourth heatmap 208(4) may represent the fourth inventory location 204(4), the fifth heatmap 208(5) may represent the fifth inventory location 204(5), the sixth heatmap 208(6) may represent the sixth inventory location 204(6), the seventh heatmap 208(7) may present the seventh inventory location 204(7), the eighth heatmap 208(8) may represent the eighth inventory location 204(8), and the ninth heatmap 208(9) may represent the ninth inventory location 204(9).

In some examples, the system(s) 114 (e.g., the component(s) described herein) generate the first heatmap 208(1) by initially analyzing the images 202 in order to identify the first inventory location 204(1). For example, the system(s) 114 may analyze the images 202 in order to identify characteristics associated with the first inventory location 204(1), such as four walls that together create the outer boundary of the first inventory location 204(1). The system(s) 114 may then generate the first heatmap 208(1) for the first inventory location 204(1) using the characteristics. For example, and with regard to the first inventory location 204(1), the system(s) 114 may generate the first heatmap 208(1) to include the portion of the images 202 that represents the inside of the outer boundary of the first inventory location 204(1) (e.g., the area of the first inventory location 204(1) that maintains items). The system(s) 114 may then perform similar processes in order to generate each of the other heatmaps 208 for each of the other inventory locations 204. While this is just one example technique of how the system(s) 114 may analyze the images 202 in order to generate the heatmaps 208, in other examples, the system(s) 114 may use additional and/or alternative techniques.

In some examples, the system(s) 114 (e.g., the component(s) described herein) may generate heatmap data representing the heatmaps 208. For example, the heatmap data may indicate that a first portion (e.g., first pixels) of the images 202 represents the first heatmap 208(1), a second portion (e.g., second pixels) of the images 202 represents the second heatmap 208(2), a third portion (e.g., third pixels) of the images 202 represents the third heatmap 208(3), a fourth portion (e.g., fourth pixels) of the images 202 represents the fourth heatmap 208(4), a fifth portion (e.g., fifth pixels) of the images 202 represents the fifth heatmap 208(6), a sixth portion (e.g., sixth pixels) of the images 202 represents the sixth heatmap 208(6), a seventh portion (e.g., seventh pixels) of the images 202 represents the seventh heatmap 208(7), an eighth portion (e.g., eighth pixels) of the images 202 represents the eighth heatmap 208(8), and a ninth portion (e.g., ninth pixels) of the images 202 represents the ninth heatmap 208(9).

Next. and as shown by the bottom-left illustration, the system(s) 114 may segment the users 206 using one or more techniques. For example, the system(s) 114 may analyze the images 202 in order to perform body part segmentation associated with the users 206. As shown, based on the processing, the system(s) may determine that a tenth portion (e.g., tenth pixels) of the images 202 represents the arm and/or hand of the first user 206(1) and that an eleventh portion (e.g., eleventh pixels) of the images 202 represents the arm and/or hand of the second user 206(2). The system(s) 114 may then use the heatmaps 208 as well as the segmentations of the users 206 in order to identify active inventory locations 204.

For example, the system(s) 114 may determine that the tenth portion 210(1) of the images 202 corresponds to the third portion of the images 202 associated with the third heatmap 208(3) and the sixth portion of the images 202 associated with the sixth heatmap 208(6). As such, the system(s) 114 may determine that the third inventory location 204(3) and the sixth inventory location 204(6) include active inventory locations 204. Additionally, the system(s) 114 may determine that the eleventh portion 210(2) of the images 202 corresponds to the seventh portion of the images 202 associated with the seventh heatmap 208(7) and the eighth portion of the images 202 associated with the eighth heatmap 208(8). As such, the system(s) 114 may determine that the seventh inventory location 204(7) and the eighth inventory location 204(8) include active inventory locations 204. As shown by the example of FIG. 2, the heatmaps 208 that represent the active inventory locations 204 include a different characteristic than the heatmaps 208 that represent the inactive inventory locations 204.

Next. and as shown by the bottom-right illustration, the system(s) 114 may continue to analyze the image data in order to determine that a twelfth portion 212 (e.g., twelfth pixels) of the images 202 now represents the arm and/or the hand of the first user 206(1). The system(s) 114 may then determine that the twelfth portion 212 of the images 202 corresponds to the first portion of the images 202 associated with the first heatmap 208(1) and the fourth portion of the images 202 associated with the fourth inventory location 204(4). As such, the system(s) 114 may determine that the first inventory location 204(1) and the fourth inventory location 204(4) now include active inventory locations 204. As shown by the example of FIG. 2, the heatmaps 208 that represent the active inventory locations 204 include a different characteristic than the heatmaps 208 that represent the inactive inventory locations 204.

In some examples, the system(s) 114 may continue to perform these processes in order to continue determining active inventory locations 204 as well as inactive inventory locations 204. Additionally, the system(s) 114 may analyze at least the portions of the image data that represent the active inventory locations 204 in order to identify events.

Figure 3:
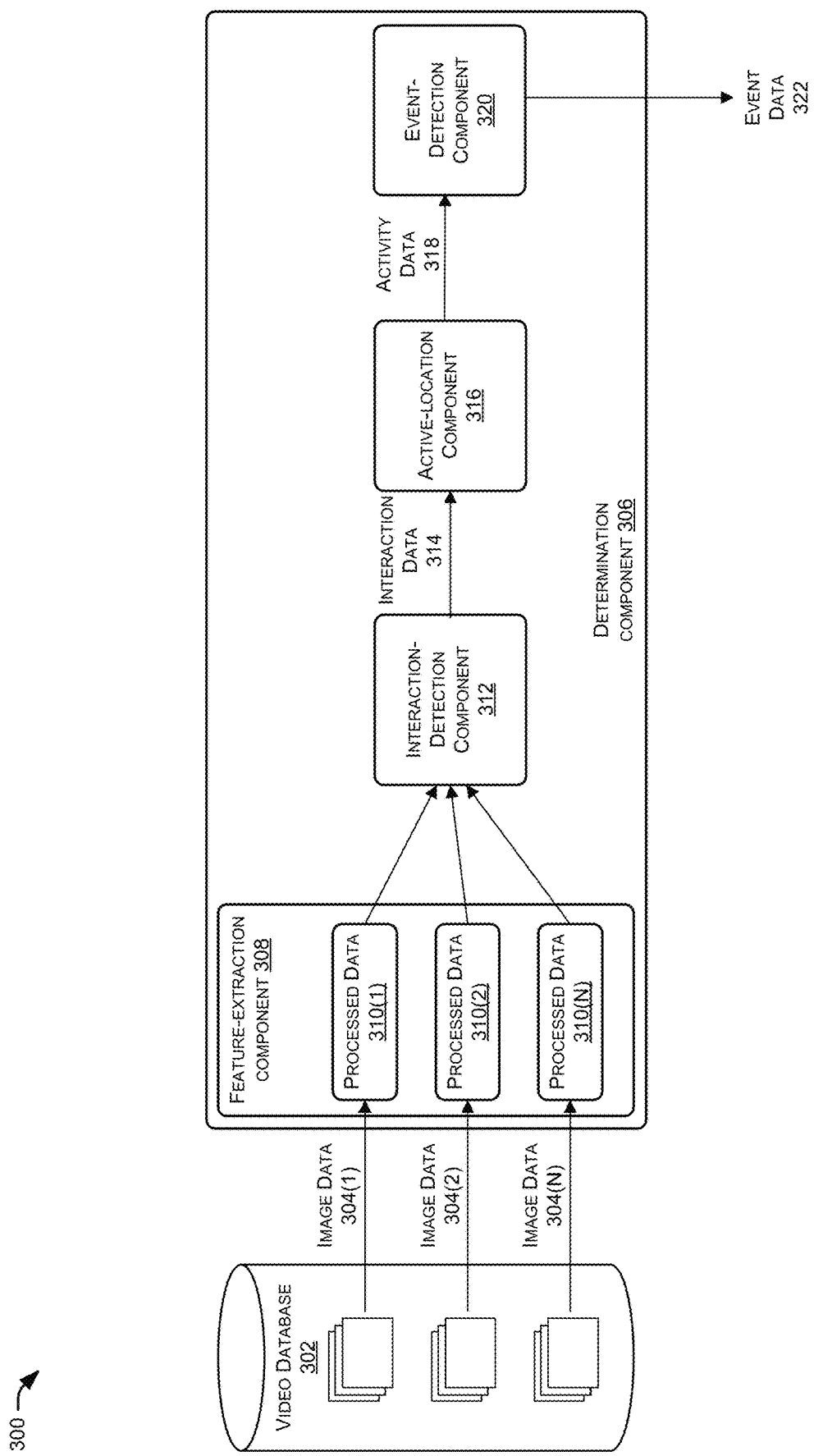
FIG. 3 illustrates an example of training components that are used to detect interactions and/or events, in accordance with examples of the present disclosure.

FIG. 3 illustrates an example architecture 300 for training component(s) that are used to detect interactions and/or events, in accordance with examples of the present disclosure. As illustrated, the architecture 300 includes a video database 302 configured to receive and store image data 304(1)-(N) (also referred to as "image data 304") generated by one or more cameras. In some examples, the image data 304 represents users interacting with inventory locations. Additionally, or alternatively, in some examples, the image data 304 represents events associated with the inventory locations. For example, the image data 304 may represent users removing items from inventory locations, users returning items to inventory locations, users searching for items at inventory locations without removing or returning items (e.g., the users rummaging through the items at the inventory locations), and/or any other types of interactions. In the example of FIG. 3, the system(s) 114 use the image data 304 to train at least a determination component 306.

For example, a feature-extraction component 308 of the determination component 306 may be configured to process the image data 304 and, based on the processing, generate processed data 310(1)-(N) (also referred to as "processed data 310") (which may include, and/or be similar to, the heatmap data and/or the feature data described herein). In some examples, the feature-extraction component 308 generates processed data 310 by abstracting away the underlying appearances of the inventory locations and users represented by the image data 304. To abstract away the appearances of the inventory locations, the feature-extraction component 308 may represent the inventory locations using heatmaps (e.g., planograms). Additionally, the feature-extraction component 308 may perform body part segmentation on the users represented by the image data 304, where the processed data 310 represents the coordinates of specific portions (e.g., the hands, the arms, etc.) of the users. In other words, the processed data 310 may represent both the heatmaps as well as the segmented portions of the users. Additionally, in some examples, the processed data 310 may indicate (e.g., classify) the type of interaction and/or type of event represented by the processed data 310.

For a first example, if the feature-extraction component 308 generates processed data 310 using image data 304 that represents a user interacting with an inventory location, then the processed data 310 may indicate that the user is interacting with the inventory location. For a second example, if the feature-extraction component 308 generates processed data 310 using image data 304 that represents a user interacting with a neighboring inventory location, then the processed data 310 may indicate that the user is interacting with the neighboring inventory location. For a third example, if the feature-extraction component 308 generates processed data 310 using image data 304 that represents a user removing an item from an inventory location, then the processed data 310 may indicate that the user is removing the item from the inventory location. Still, for a fourth example, if the feature-extraction component 308 generates processed data 310 using image data 304 that represents a user replacing an item on an inventory location, then the processed data 310 may indicate that the user is replacing the item.

An interaction-detection component 312 may then be configured to analyze the processed data 310 in order to identify interactions between users and inventory locations. As described herein, the interaction-detection component 312 may identify an interaction when a first portion (e.g., first pixels) of the processed data 310 that represents a portion (e.g., the hand) of the user corresponds to (e.g., overlap, match, intersect, etc.) a second portion (e.g., second pixels) of the processed data 310 that represents an inventory location. In some examples, the interaction-detection component 312 may determine that the first portion of the processed data 310 corresponds to the second portion of the processed data 310 using coordinates associated with the first portion of the processed data 310 and/or coordinates associated with the second portion of the processed data 310. As described herein, the coordinates may include u,v coordinates.

In some examples, the interaction-detection component 312 may generate interaction data 314 representing the interactions between the users and the inventory locations. An active-location component 316 of the determination component 306 may then process the interaction data 314 in order to identify active inventory locations. As described herein, an active inventory location may include an inventory location for which there was a previous and/or current interaction between the inventory location and a user. For example, the active-location component 316 may identify an active inventory location when at least a portion of a user is located over the inventory location. In the example of FIG. 3, the active-location component 316 may then generate activity data 318 representing at least the active inventory locations, time periods that the inventory locations are active, identities of users interacting with the active inventory locations, locations of the active inventory locations, and/or any other information associated with the interactions.

An event-detection component 320 of the determination component 306 may then use the activity data 318 to determine which inventory locations include active inventory locations. Additionally, the event-detection component 320 may use the determination to determine which portions of the image data 304 and/or the processed data 310 to analyze in order to identify events that occur with the inventory locations. For example, the event-detection component 320 may analyze the activity data 318 in order to determine that a user is interacting with an inventory location (e.g., the inventory location includes an active inventory location). Based on the determination, the event-detection component 320 may analyze the portion of the image data 304 that represents the inventory location and/or the portion of the processed data 310 that represents the inventory location. Based on the analysis, the event-detection component 320 may identify an event.

For a first example, if the event-detection component 320 determines that the portion of the image data 304 and/or the portion of the processed data 310 represents the user removing an item from the inventory location, then the event-detection component 320 may determine that the event includes a removal of the item. In some examples, the event-detection component 320 makes the determination based on determining that the image data 304 represents the hand of the user as empty while moving toward the inventory location and holding the item while moving away from the inventory location. For a second example, if the event-detection component 320 determines that the portion of the image data 304 and/or the portion of the processed data 310 represents the user returning an item to the inventory location, then the event-detection component 320 may determine that the event includes a return of the item. In some examples, the event-detection component 320 makes the determination based on determining that the image data 304 represents the hand of the user as holding the item while moving toward the inventory location and empty while moving away from the inventory location.

Still, for a third example, if the event-detection component 320 determines that the portion of the image data 304 and/or the portion of the processed data 310 represents the user searching through the items at the inventory location without removing or returning an item, then the event-detection component 320 may determine that the event includes a rummage through the inventory location. In some examples, the event-detection component 320 makes the determination based on determining that the image data 304 represents the hand of the user as empty while moving toward the inventory location and empty while moving away from the inventory location. While these are just a couple example events that the event-detection component 320 may identify, in other examples, the event-detection component 320 may identify additional and/or alternative events.

The event-detection component 320 may then output event data 322 representing the event type (e.g., removal, returning, rummaging, etc.), a period of time associated with the event, an item type, an identity of a user associated with the event, a location of the event (e.g., a location of the inventory location), and/or any other information associated with the event. In some examples, the system(s) 114 may then analyze the activity data 318 and/or the event data 322 to determine if the outputs from the determination component 306 are correct. Additionally, one or more parameters associated with the determination component 306 (e.g., one or more parameters associated with algorithm(s) used by the determination component 306) may be modified based on the results.

For a first example, the system(s) 114 may analyze the activity data 318 to determine that the activity data 318 indicates that image data 304 represents an interaction between a user and an inventory location. The system(s) 114 may then compare that result to a known result for the image data 304 (e.g., the classification for the image data 304). Based on the comparison, the system(s) 114 may determine whether the result from the determination component 306 was correct. For instance, the system(s) 114 may determine that the result was correct when the known result indicates that the image data 304 represents the user interacting with the inventory location, but determine that the result was incorrect when the know result indicates that the image data 304 does not represent the user interacting with the inventory location. The system(s) 114 may then adjust one or more parameters of the determination component 306 based on the determination.

For a second example, the system(s) 114 may analyze the event data 322 to determine that the event data 322 indicates that image data 304 represents a user removing an item from an inventory location. The system(s) 114 may then compare that result to a known result for the image data 304 (e.g., the classification for the image data 304). Based on the comparison, the system(s) 114 may determine whether the result from the determination component 306 was correct. For instance, the system(s) 114 may determine that the result was correct when the known result indicates that the image data 304 represents the user removing an item from the inventory location, but determine that the result was incorrect when the know result indicates that the image data 304 does not represent the user removing an item from the inventory location. The system(s) 114 may then adjust one or more parameters of the determination component 306 based on the determination.

In other words, the system(s) 114 may train the determination component 306 (e.g., the components included in the determination component 306) by adjusting parameters based on the results from the determination component 306 and the known results for the image data 304. In some examples, the system(s) 114 train the determination component 306 until the results satisfy (e.g., are equal to or greater than) a threshold. The threshold may include, but is not limited to, 95%, 98%, 99%, 99.9%, and/or any other threshold. Additionally, in some examples, the system(s) 114 may continue to train the determination component 306 using new image data 304 that is generated by one or more cameras at one or more facilities.

In some examples, the determination component 306 may perform similar processes as those described above in order to process new image data 304 that is generated by a camera at a facility. For example, after training the determination component 306, and as described herein, the system(s) 114 may use the determination component 306 in order to identify interactions and events that occur at inventory locations at one or more facilities. Additionally, while the example of FIG. 3 illustrates the determination component 306 as including four separate components (e.g., the feature-extraction component 308, the interaction-detection component 312, the active-location component 316, and the event-detection component 320), in other examples, one or more of the components may be combined into a single component. Additionally, in some examples, one or more of the components may not be included in the determination component 306. Rather, the determination component 306 may receive the output from the one or more external components and then process the output using the processes described herein.

Figure 4:
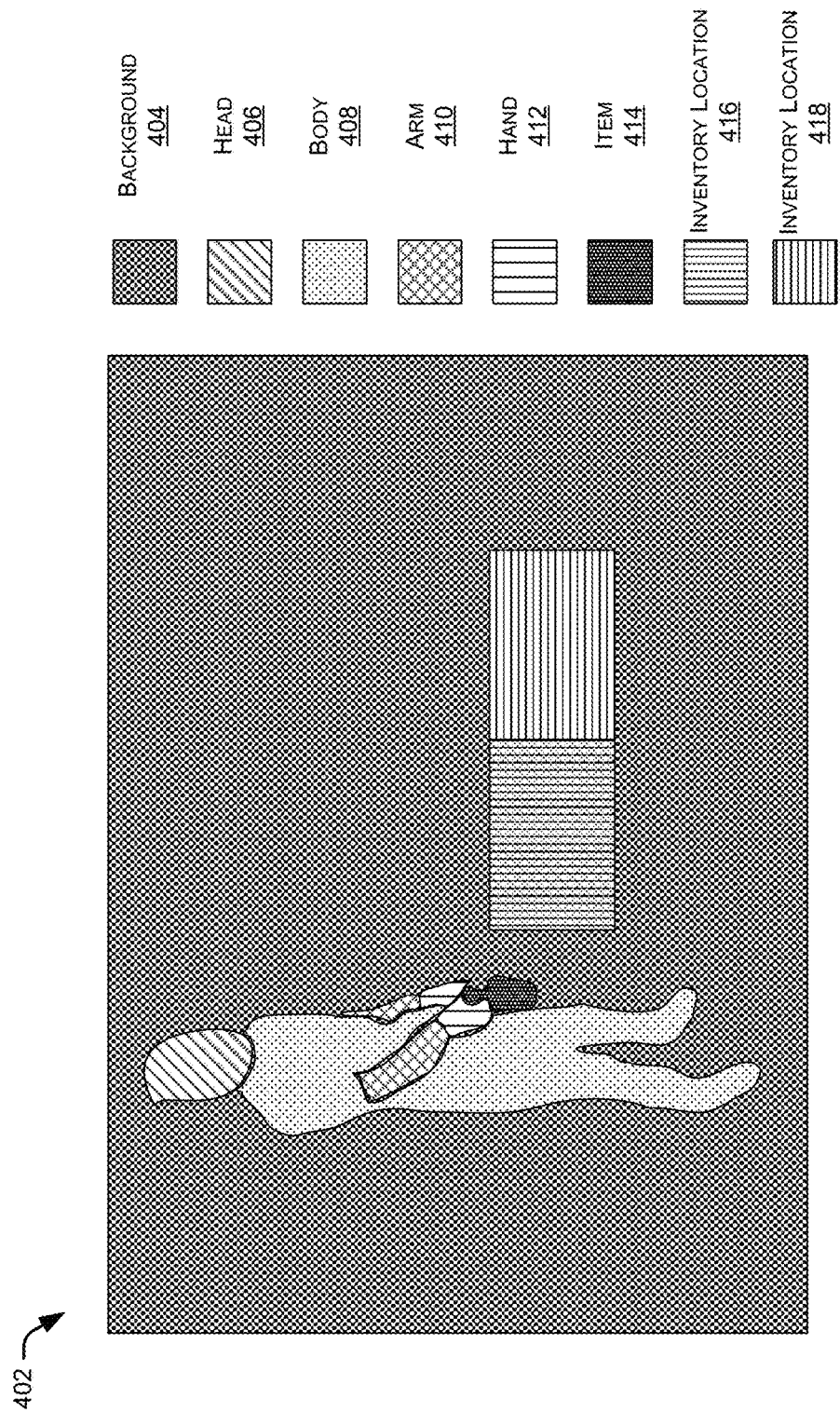
FIG. 4 illustrates an example frame of image data that been segmented using a feature-extraction component (e.g., computer-vision algorithms) and associated with example semantic labels, in accordance with examples of the present disclosure.

As described above, in order for the determination component 306 to analyze image data 304, body part segmentation may be performed on the image data 304 in order to identify various portions of a user (and/or more than one user) represented by the image data 304. As such, FIG. 4 illustrates an example segmentation 402 of a particular frame of image data. As illustrated, the segmentation 402, which may be represented by processed data 310, indicates that different areas of the frame of image data have been associated with example semantic labels (e.g., "labels") using, for example, classifiers of the feature-extraction component 308. In this example, the semantic labels include background 404, head 406, body 408, arm 410, hand 412, item (or item in hand) 414, a first inventory location 416, and a second inventory location 418. Of course, it is to be appreciated that these are merely examples and that any other type of semantic label may be used. It is also noted that a classifier used to generate this example segmentation 402 may be trained by employing human users to use computer-graphics tools to assign the respective semantic labels 404-418 to the different regions of the frame. After one or more of the human users assign these semantic labels to a threshold amount of image data, the classifier may be trained to apply the semantic labels to still additional image data.

Figure 5:
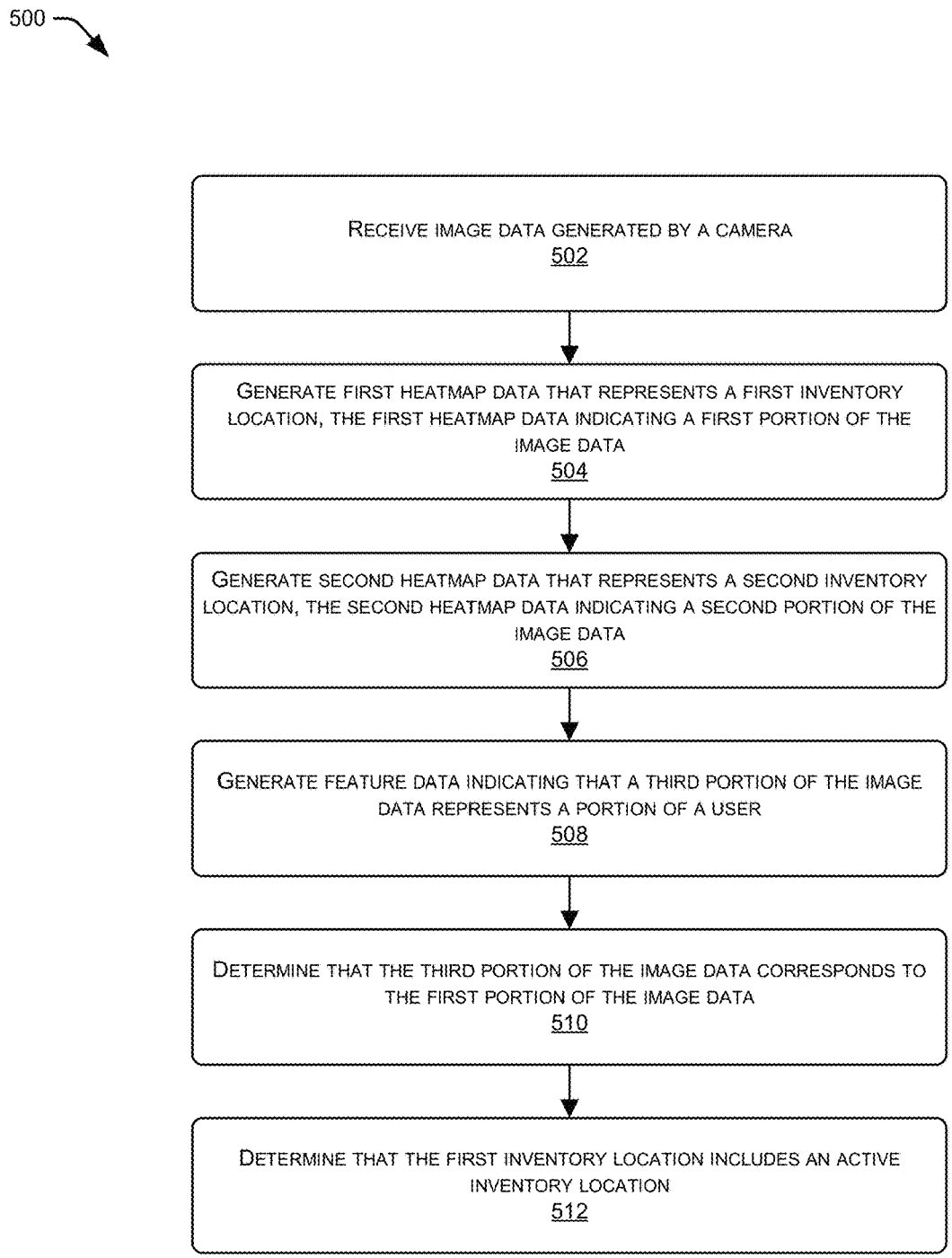
FIG. 5 illustrates an example process for determining that a user is interacting with an inventory location, in accordance with examples of the present disclosure.
Figure 6:
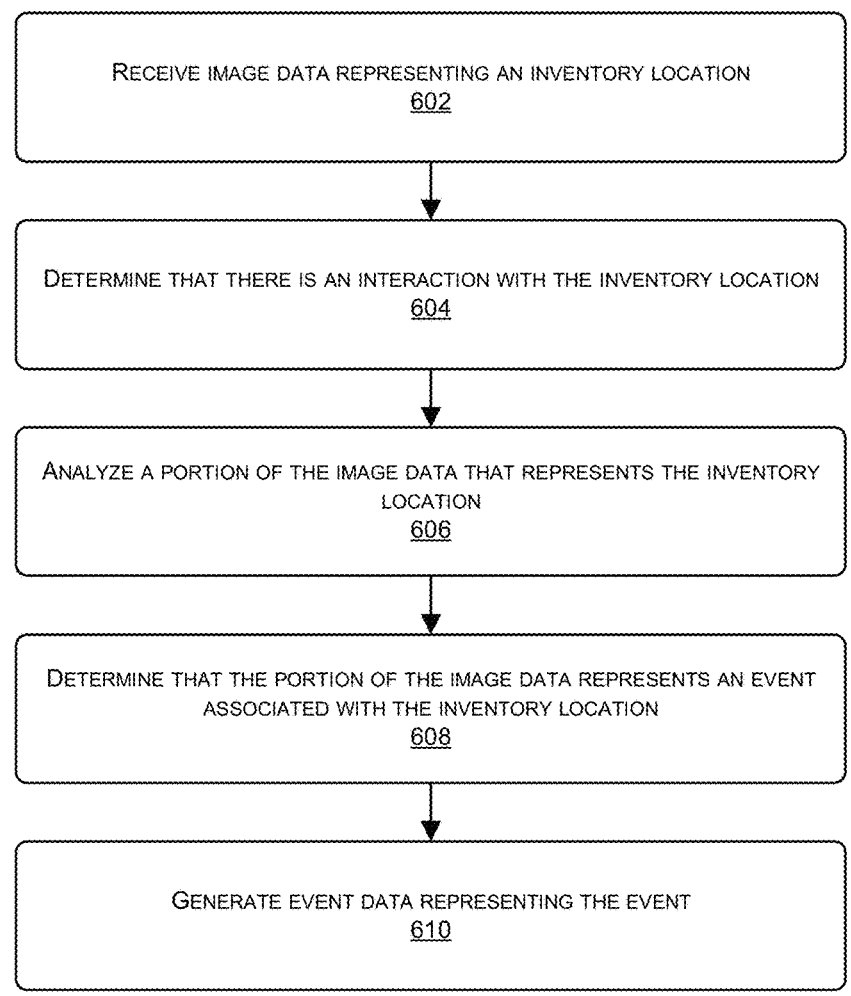
FIG. 6 illustrates an example process for determining that an event occurred at an inventory location, in accordance with examples of the present disclosure.
Figure 7:
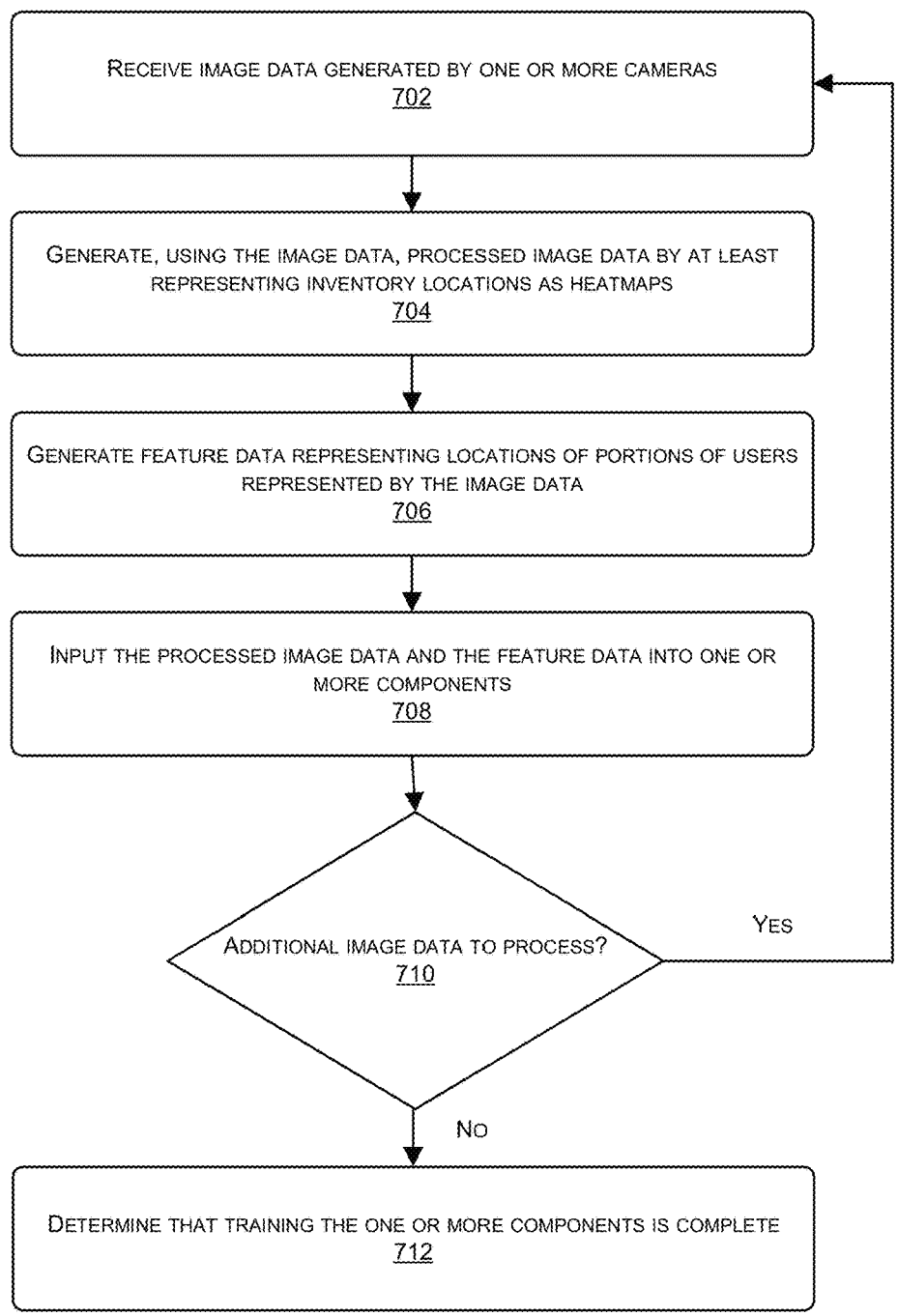
FIG. 7 illustrates an example process for training one or more components that identify interactions and/or events associated with inventory locations, in accordance with examples of the present disclosure.

FIGS. 5-7 illustrate various processes for identifying interactions and events. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 5 illustrates an example process 500 for determining that a user is interacting with an inventory location, in accordance with examples of the present disclosure. At 502, the process 500 may include receiving image data generated by a camera. For instance, the system(s) 114 may receive the image data generated by the camera located at a facility. In some examples, the image data represents an interaction between a user and a first inventory location. For instance, the image data may represent the user removing an item from the first inventory location, returning an item to the first inventory location, and/or searching through items located at the inventory location, but without removing or returning an item.

At 504, the process 500 may include generating first heatmap data that represents a first inventory location, the first heatmap data indicating a first portion of the image data. For instance, the system(s) 114 may generate the first heatmap data that represents the first inventory location. In some examples, the first inventory location includes a first bin associated with another inventory location, such as a table. In some examples, the system(s) 114 generate the first heatmap data by analyzing the image data in order to identify the first inventory location. For instance, the system(s) 114 may identify the first inventory location based on one or more characteristics associated with the first inventory location. The system(s) 114 may then generate the first heatmap data to represent at least the top (e.g., the opening) of the first inventory location. Additionally, or alternatively, in some examples, the system(s) 114 generate the first heatmap data using input data that indicates the location of the first inventory location.

At 506, the process 500 may include generating second heatmap data that represents a second inventory location, the second heatmap data indicating a second portion of the image data. For instance, the system(s) 114 may generate the second heatmap data that represents the second inventory location. In some examples, the second inventory location includes a second bin associated with the other inventory location, such as a neighboring bin to the first bin. In some examples, the system(s) 114 generate the second heatmap data by analyzing the image data in order to identify the second inventory location. For instance, the system(s) 114 may identify the second inventory location based on one or more characteristics associated with the second inventory location. The system(s) 114 may then generate the second heatmap data to represent at least the top (e.g., the opening) of the second inventory location. Additionally. or alternatively, in some examples, the system(s) 114 generate the second heatmap data using input data that indicates the location of the second inventory location.

At 508, the process 500 may include generating feature data indicating that a third portion of the image data represents a portion of the user. For instance, the system(s) 114 may generate the feature data indicating at least the third portion of the image data that represents the portion of the user. In some examples, to generate the feature data, the system(s) 114 perform body part segmentation on the user in order to identify the hand and/or arm of the user as represented by the image data. The system(s) 114 may then determine the third portion of the image data as representing the hand and/or the arm. As such, the system(s) 114 may generate the feature data to indicate the third portion of the image data.

At 510, the process 500 may include determining that the third portion of the image data corresponds to the first portion of the image data. For instance, the system(s) 114 may determine that the third portion of the image data corresponds to the first portion of the image data. In some examples, the system(s) 114 make the determination by analyzing the feature data with respect to the first heatmap data. Based on the analysis, the system(s) 114 may determine that third pixels included in the third portion of the image data overlap, match, and/or intersect with first pixels included in the first portion of the image data. Additionally, in some examples, the system(s) 114 may perform similar processes in order to determine if the third portion of the image data also corresponds to the second portion of the image data.

For example, the system(s) 114 may determine that the third portion of the image data does not correspond to the second portion of the image data. In some examples, the system(s) 114 make the determination by analyzing the feature data with respect to the second heatmap data. Based on the analysis, the system(s) 114 may determine that the third pixels included in the third portion of the image data do not overlap, match, and/or intersect with second pixels included in the second portion of the image data.

At 512, the process 500 may include determining that the first inventory location includes an active inventory location. For instance, the system(s) 114 may determine that the first inventory location includes the active inventory location based on the third portion of the image data corresponding to the first portion of the image data. As described herein, an activate active inventory location may include an inventory location that a user is currently interacting with and/or previously interacted with. The system(s) 114 may then generate and/or output data indicating that the first inventory location is active. Additionally, in some examples, the system(s) 114 may determine that the second inventory location includes an inactive inventory location based on the third portion of the image data not corresponding to the second portion of the image data.

In some examples, the system(s) 114 perform the example process 500 of FIG. 5 using the determination component 306. For example, the feature-extraction component 308 may generate the first heatmap data, the second heatmap data, and/or the feature data (which may represent, and/or include, processed data 310). Additionally, the interaction-detection component 312 may analyze the feature data with respect to the first heatmap data in order to determine that the third portion of the image data corresponds to the first portion of the image data. Furthermore, the active-location component 316 may then determine that the first inventory location is active.

FIG. 6 illustrates an example process 600 for determining that an event occurred at an inventory location, in accordance with examples of the present disclosure. At 602, the process 600 may include receiving image data representing an inventory location. For instance, the system(s) 114 may receive the image data generated by a camera located at a facility. In some examples, the image data represents an interaction between a user and the inventory location. For instance, the image data may represent the user removing an item from the inventory location, returning an item to the inventory location, and/or searching through items located at the inventory location, but without removing or returning an item (e.g., the user rummaging through the items at the inventory location).

At 604, the process 600 may include determining that there is an interaction with the inventory location and at 606, the process 600 may include analyzing a portion of the image data that represents the inventory location. For instance, the system(s) 114 may determine that a user is interacting with the inventory location. In some examples, the system(s) 114 make the determination using one or more of the processes described herein (e.g., performing the example process 500 of FIG. 5). Based on the determination, the system(s) 114 may determine that the inventory location is activate. Additionally, based on the determination, the system(s) 114 may analyze the portion of the image data that represents the inventory location.

At 608, the process 600 may include determining that the portion of the image data represents an event associated with the inventory location. For instance, based on the analysis, the system(s) 114 may determine that the portion of the image data represents the event. For a first example, the system(s) 114 may determine that the portion of the image data represents a removal of an item when the portion of the image data represents the hand of the user as empty while moving toward the inventory location and holding the item while moving away from the inventory location. For a second example, the system(s) 114 may determine that the portion of the image data represents a return of an item when the portion of the image data represents the hand of the user as holding the item while moving toward the inventory location and empty while moving away from the inventory location. Still, for a third example, the system(s) 114 may determine that the portion of the image data represents a rummage when the portion of the image data represents the hand of the user empty while moving toward the inventory location and also empty while moving away from the inventory location.

At 610, the process 600 may include generating event data representing the event. For instance, the system(s) 114 may generate the event data representing the event. In some examples, the event data may also represents a time period associated with the event, a location of the inventory location, an item type associated with the item, a number of items removed/replaced, an identity of the user, and/or any other information associated with the event.

FIG. 7 illustrates an example process 700 for training one or more components that identify interactions and/or events associated with inventory locations, in accordance with examples of the present disclosure. At 702, the process 700 may include receiving image data generated by one or more cameras. For instance, the system(s) 114 may receive the image data generated by the one or more cameras. As described herein, the image data may represent interactions and/or events that occur with inventory locations. For example, the image data may represent a user interacting with an inventory location, a user interacting with a neighboring inventory locations, a user removing an item from an inventory location, a user returning an item to an inventory location, a user searching through items at an inventory location without removing or returning an item, and/or the like.

At 704, the process 700 may include generating, using the image data, processed image data by at least representing inventory locations as heatmaps. For instance, the system(s) 114 may process the image data by at least abstracting away the underlying appearances of the inventory locations represented by the image data. In some examples, the remote system(s) 114 remove the underlying appearances by representing the inventory locations as heatmaps. As described herein, a heatmap may include, but is not limited to, a planogram, a shape (e.g., a circle, a polygon, etc.), and/or the like that represents the inventory location.

At 706, the process 700 may include generating feature data representing locations of portions of users represented by the image data. For instance, the system(s) 114 may process the image data using body part segmentation. Based on the processing, the system(s) may identify portions of the image data that represent various portions of the users, such as hands and/or arms. The system(s) 114 may then generate the feature data representing the locations (e.g., portions) of the image data that represent specific portions (e.g., the hands and/or arms) of the users. In some examples, the locations are represented by coordinates, such as u,v coordinates that represent the locations.

At 708, the process 700 may include inputting the processed image data and the feature data into one or more components. For instance, the remote system(s) 114 may input the processed image data and the feature data into the component(s) in order to train the component(s) to detect interactions and/or events. For example, to train the component(s), the system(s) 114 may update one or more parameters of the component(s) based on the results determined by the component(s) when analyzing the processed image data and the feature data. For example, the results may be compared to known results and the parameter(s) may be adjusted based on the comparisons in order to improve the results of the component(s).

At 710, the process 700 may include determining whether there is additional image data to process. For instance, the system(s) 114 may determine whether there is additional image data for training the component(s). If, at 710, it is determined that there is additional image data to process, then the process 700 may repeat back at 702. For instance, if the system(s) 114 determine that there is additional image data to use to train the component(s), then the system(s) 114 may repeat 702 through 708 to further train the component(s). However, if, at 710, it is determined that there is not additional image data to process, then, at 712, the process 700 may include determining that training the one or more components is complete. For instance, if the system(s) 114 determine that there is no additional image data to use to train the component(s), then the system(s) 114 may determine that training the component(s) is complete.

Figure 8:
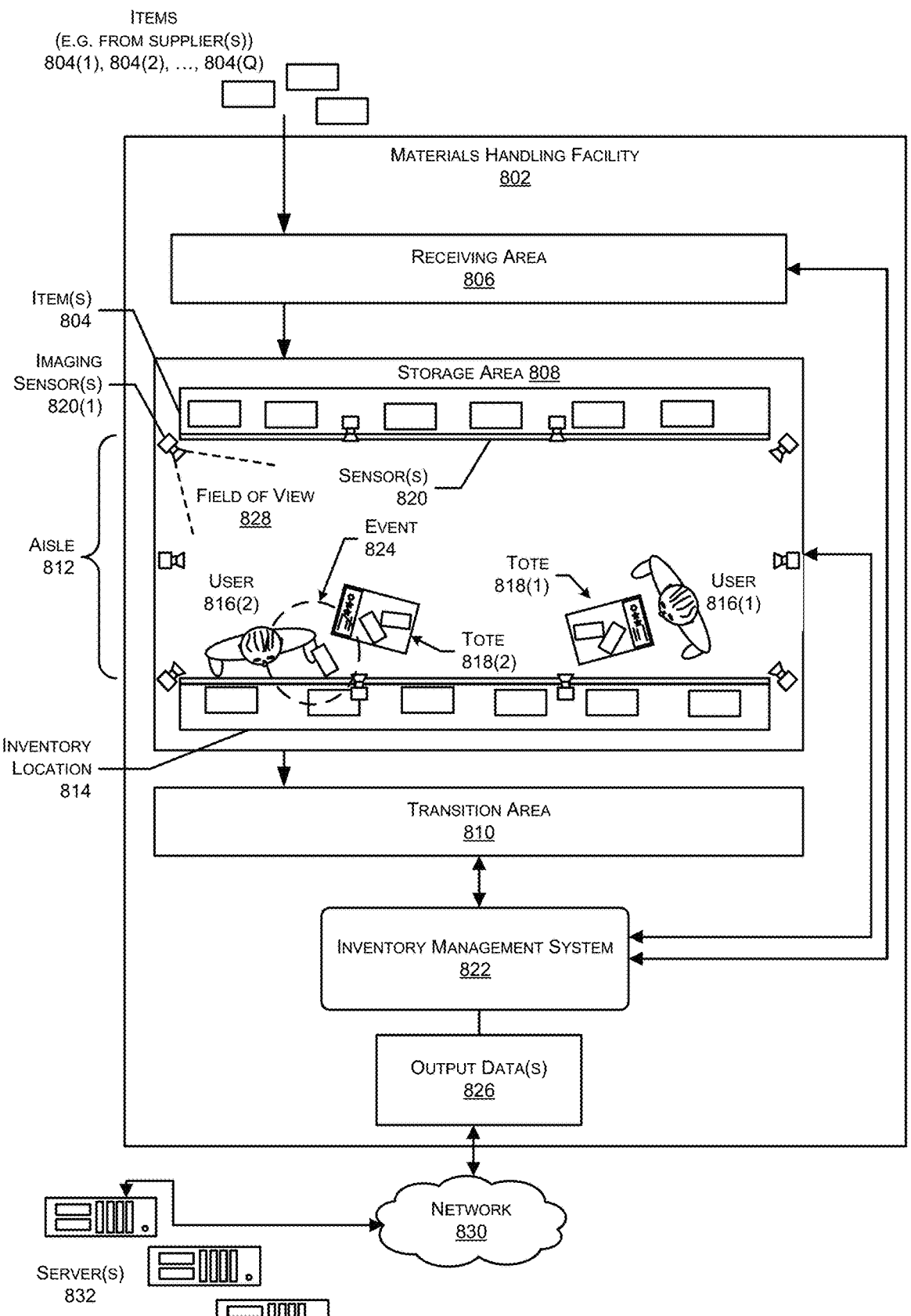
FIG. 8 is a block diagram of an example materials handling facility that includes sensors and an inventory management system configured to generate output regarding events occurring in the facility using the sensor data.
Figure 9:
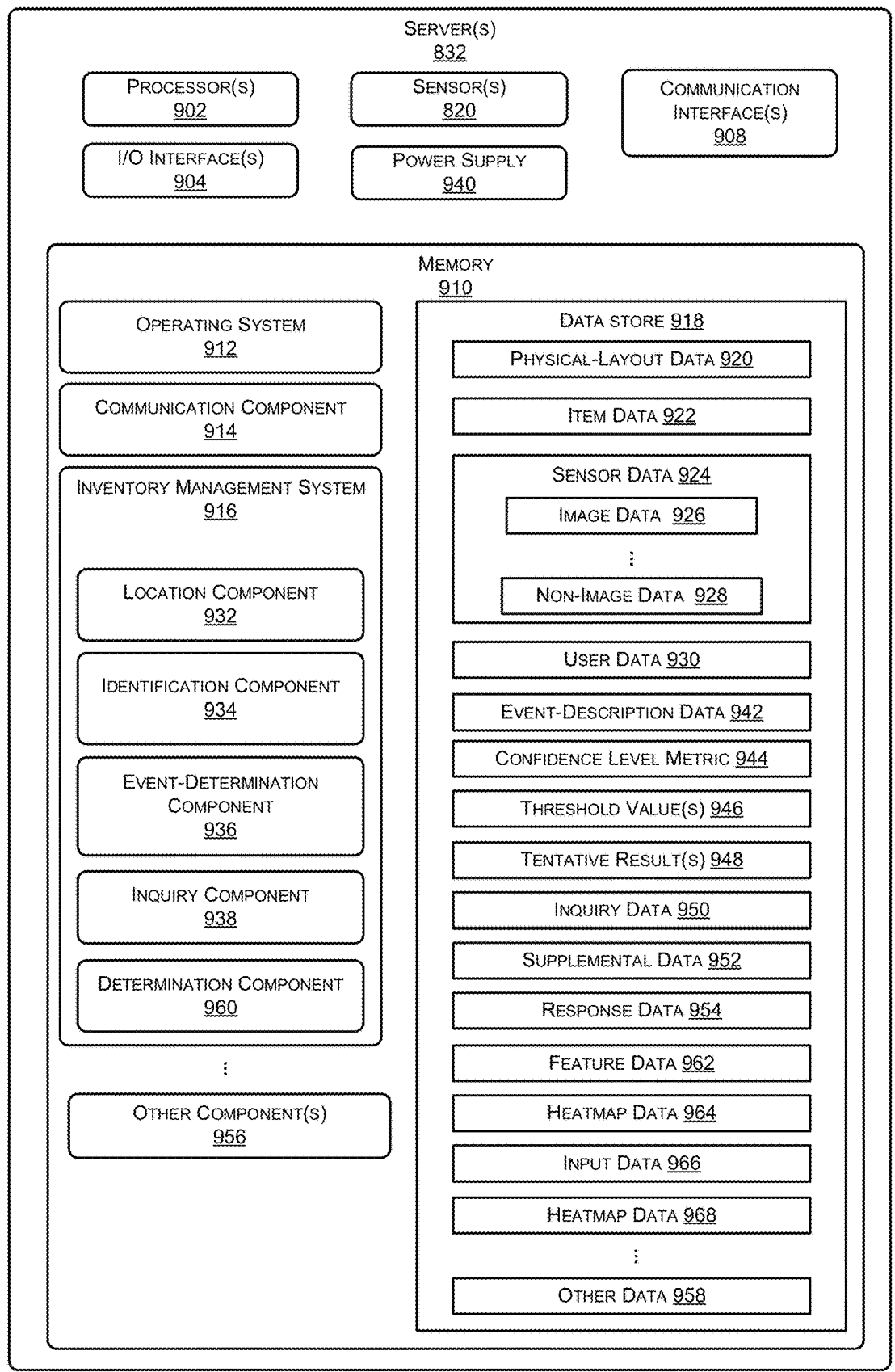
FIG. 9 illustrates a block diagram of one or more servers configured to support operation of the facility. As illustrated, the servers may include a checkout-eligibility component for determining whether a user is eligible to exit the facility with one or more picked items without performing a manual checkout of the items.

FIGS. 8 and 9) represent an illustrative materials handling environment, such as the materials handling facility 802, in which the techniques described herein may be applied to cameras monitoring the environments as described below. However, the following description is merely one illustrative example of an industry and environment in which the techniques described herein may be utilized. The materials handling facility 802 (or "facility") comprises one or more physical structures or areas within which one or more items 804(1), 804(2), . . . 804(Q) (generally denoted as 804) may be held. As used in this disclosure, letters in parentheses such as "(Q)" indicate an integer result. The items 804 comprise physical goods, such as books, pharmaceuticals, repair parts, electronic gear, groceries, and so forth.

The facility 802 may include one or more areas designated for different functions with regard to inventory handling. In this illustration, the facility 802 includes a receiving area 806, a storage area 808, and a transition area 810. The receiving area 806 may be configured to accept items 804, such as from suppliers, for intake into the facility 802. For example, the receiving area 806 may include a loading dock at which trucks or other freight conveyances unload the items 804. Nice!

The storage area 808 is configured to store the items 804. The storage area 808 may be arranged in various physical configurations. In one implementation, the storage area 808 may include one or more aisles 812. The aisle 812 may be configured with, or defined by, inventory locations 814 on one or both sides of the aisle 812. The inventory locations 814 may include one or more of shelves, racks, cases, cabinets, bins, floor locations, or other suitable storage mechanisms for holding or storing the items 804. The inventory locations 814 may be affixed to the floor or another portion of the facility's structure, or may be movable such that the arrangements of aisles 812 may be reconfigurable. In some implementations, the inventory locations 814 may be configured to move independently of an outside operator. For example, the inventory locations 814 may comprise a rack with a power source and a motor, operable by a computing device to allow the rack to move from one location within the facility 802 to another.

One or more users 816(1), 816(2) (generally denoted as 816), totes 818(1), 818(2) (generally denoted as 818) or other material handling apparatus may move within the facility 802. For example, the users 816 may move about within the facility 802 to pick or place the items 804 in various inventory locations 814, placing them on the totes 818 for ease of transport. An individual tote 818 is configured to carry or otherwise transport one or more items 804. For example, a tote 818 may include a basket, a cart, a bag, and so forth. In other implementations, other agencies such as robots, forklifts, cranes, aerial drones, and so forth, may move about the facility 802 picking, placing, or otherwise moving the items 804.

One or more sensors 820 may be configured to acquire information in the facility 802. The sensors 820 in the facility 802 may include sensors fixed in the environment (e.g., ceiling-mounted cameras) or otherwise, such as sensors in the possession of users (e.g., mobile phones, tablets, etc.). The sensors 820 may include, but are not limited to, cameras 820(1), weight sensors, radio frequency (RF) receivers, temperature sensors, humidity sensors, vibration sensors, and so forth. The sensors 820 may be stationary or mobile, relative to the facility 802. For example, the inventory locations 814 may contain cameras 820(1) configured to acquire images of pick or placement of items 804 on shelves, of the users 816(1) and 816(2) in the facility 802, and so forth. In another example, the floor of the facility 802 may include weight sensors configured to determine a weight of the users 816 or another object thereupon.

During operation of the facility 802, the sensors 820 may be configured to provide information suitable for tracking how objects move or other occurrences within the facility 802. For example, a series of images acquired by a camera 820(1) may indicate removal of an item 804 from a particular inventory location 814 by one of the users 816 and placement of the item 804 on or at least partially within one of the totes 818.

While the storage area 808 is depicted as having one or more aisles 812, inventory locations 814 storing the items 804, sensors 820, and so forth, it is understood that the receiving area 806, the transition area 810, or other areas of the facility 802 may be similarly equipped. Furthermore, the arrangement of the various areas within the facility 802 is depicted functionally rather than schematically. For example, multiple different receiving areas 806, storage areas 808, and transition areas 810 may be interspersed rather than segregated in the facility 802.

The facility 802 may include, or be coupled to, an inventory management system 822, which may perform some or all of the techniques described above with reference to FIGS. 1-7. For example, the inventory management system 822 may maintain a virtual cart of each user within the facility. The inventory management system 822 may also store a record associated with each user indicating the location of the user, and whether the user is eligible to exit the facility with one or more items without performing a manual checkout of the items. The inventory management system 822 may also generate and output notification data to the users, indicating whether or not they are so eligible.

As illustrated, the inventory management system 822 may reside at the facility 802 (e.g., as part of on-premises servers), on the servers 832 (which may represent, and/or include, the system(s) 114) that are remote from the facility 802, a combination thereof. In each instance, the inventory management system 822 is configured to identify interactions and events with and between users 816, devices such as sensors 820, robots, material handling equipment, computing devices, and so forth, in one or more of the receiving area 806, the storage area 808, or the transition area 810. As described above, some interactions may further indicate the existence of one or more events 824, or predefined activities of interest. For example, events 824 may include the entry of the user 816 to the facility 802, stocking of items 804 at an inventory location 814, picking of an item 804 from an inventory location 814, returning of an item 804 to an inventory location 814, placement of an item 804 within a tote 818, movement of users 816 relative to one another, gestures by the users 816, and so forth. Other events 824 involving users 816 may include the user 816 providing authentication information in the facility 802, using a computing device at the facility 802 to authenticate the user to the inventory management system 822, and so forth. Some events 824 may involve one or more other objects within the facility 802. For example, the event 824 may comprise movement within the facility 802 of an inventory location 814, such as a counter mounted on wheels. Events 824 may involve one or more of the sensors 820. For example, a change in operation of a sensor 820, such as a sensor failure, change in alignment, and so forth, may be designated as an event 824. Continuing the example, movement of a camera 820(1) resulting in a change in the orientation of the field of view 828 (such as resulting from someone or something bumping the camera 820(1)) may be designated as an event 824.

By determining the occurrence of one or more of the events 824, the inventory management system 822 may generate output data 826. The output data 826 comprises information about the event 824. For example, where the event 824 comprises an item 804 being removed from an inventory location 814, the output data 826 may comprise an item identifier indicative of the particular item 804 that was removed from the inventory location 814 and a user identifier of a user that removed the item.

The inventory management system 822 may use one or more automated systems to generate the output data 826. For example, an artificial neural network, one or more classifiers, or other automated machine learning techniques may be used to process the sensor data from the one or more sensors 820 to generate output data 826. For example, the inventory management system 822 may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 826 or the tentative results. The automated systems may generate confidence level data that provides information indicative of the accuracy or confidence that the output data 826 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 98%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 804, user 816, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 816 may pick an item 804(1) such as a perfume bottle that is generally cubical in shape from the inventory location 814. Other items 804 at nearby inventory locations 814 may be predominantly spherical. Based on the difference in shape (cube vs. sphere) from the adjacent items, and the correspondence in shape with the previously stored image of the perfume bottle item 804(1) (cubical and cubical), the confidence level that the user has picked up the perfume bottle item 804(1) is high.

In some situations, the automated techniques may be unable to generate output data 826 with a confidence level above a threshold result. For example, the automated techniques may be unable to distinguish which user 816 in a crowd of users 816 has picked up the item 804 from the inventory location 814. In other situations, it may be desirable to provide human confirmation of the event 824 or of the accuracy of the output data 826. For example, some items 804 may be deemed age restricted such that they are to be handled only by users 816 above a minimum age threshold.

In instances where human confirmation is desired, sensor data associated with an event 824 may be processed to generate inquiry data. The inquiry data may include a subset of the sensor data associated with the event 824. The inquiry data may also include one or more of one or more tentative results as determined by the automated techniques, or supplemental data. The subset of the sensor data may be determined using information about the one or more sensors 820. For example, camera data such as the location of the camera 820(1) within the facility 802, the orientation of the camera 820(1), and a field of view 828 of the camera 820(1) may be used to determine if a particular location within the facility 802 is within the field of view 828. The subset of the sensor data may include images that may show the inventory location 814 or that the item 804 was stowed. The subset of the sensor data may also omit images from other cameras 820(1) that did not have that inventory location 814 in the field of view 828. The field of view 828 may comprise a portion of the scene in the facility 802 that the sensor 820 is able to generate sensor data about.

Continuing the example, the subset of the sensor data may comprise a video clip acquired by one or more cameras 820(1) having a field of view 828 that includes the item 804. The tentative results may comprise the "best guess" as to which items 804 may have been involved in the event 824. For example, the tentative results may comprise results determined by the automated system that have a confidence level above a minimum threshold.

The facility 802 may be configured to receive different kinds of items 804 from various suppliers and to store them until a customer orders or retrieves one or more of the items 804. A general flow of items 804 through the facility 802 is indicated by the arrows of FIG. 8. Specifically, as illustrated in this example, items 804 may be received from one or more suppliers, such as manufacturers, distributors, wholesalers, and so forth, at the receiving area 806. In various implementations, the items 804 may include merchandise, commodities, perishables, or any suitable type of item 804, depending on the nature of the enterprise that operates the facility 802. The receiving of the items 804 may comprise one or more events 824 for which the inventory management system 822 may generate output data 826.

Upon being received from a supplier at receiving area 806, the items 804 may be prepared for storage. For example, items 804 may be unpacked or otherwise rearranged. The inventory management system 822 may include one or more software applications executing on a computer system to provide inventory management functions based on the events 824 associated with the unpacking or rearrangement. These inventory management functions may include maintaining information indicative of the type, quantity, condition, cost, location, weight, or any other suitable parameters with respect to the items 804. The items 804 may be stocked, managed, or dispensed in terms of countable, individual units or multiples, such as packages, cartons, crates, pallets, or other suitable aggregations. Alternatively, some items 804, such as bulk products, commodities, and so forth, may be stored in continuous or arbitrarily divisible amounts that may not be inherently organized into countable units. Such items 804 may be managed in terms of measurable quantity such as units of length, area, volume, weight, time, duration, or other dimensional properties characterized by units of measurement. Generally speaking, a quantity of an item 804 may refer to either a countable number of individual or aggregate units of an item 804 or a measurable amount of an item 804, as appropriate.

After arriving through the receiving area 806, items 804 may be stored within the storage area 808. In some implementations, like items 804 may be stored or displayed together in the inventory locations 814 such as in bins, on shelves, hanging from pegboards, and so forth. In this implementation, all items 804 of a given kind are stored in one inventory location 814. In other implementations, like items 804 may be stored in different inventory locations 814. For example, to optimize retrieval of certain items 804 having frequent turnover within a large physical facility 802, those items 804 may be stored in several different inventory locations 814 to reduce congestion that might occur at a single inventory location 814. Storage of the items 804 and their respective inventory locations 814 may comprise one or more events 824.

When a customer order specifying one or more items 804 is received, or as a user 816 progresses through the facility 802, the corresponding items 804 may be selected or "picked" from the inventory locations 814 containing those items 804. In various implementations, item picking may range from manual to completely automated picking. For example, in one implementation, a user 816 may have a list of items 804 they desire and may progress through the facility 802 picking items 804 from inventory locations 814 within the storage area 808, and placing those items 804 into a tote 818. In other implementations, employees of the facility 802 may pick items 804 using written or electronic pick lists derived from customer orders. These picked items 804 may be placed into the tote 818 as the employee progresses through the facility 802. Picking may comprise one or more events 824, such as the user 816 in moving to the inventory location 814, retrieval of the item 804 from the inventory location 814, and so forth.

After items 804 have been picked, they may be processed at a transition area 810. The transition area 810 may be any designated area within the facility 802 where items 804 are transitioned from one location to another or from one entity to another. For example, the transition area 810 may be a packing station within the facility 802. When the item 804 arrives at the transition area 810, the items 804 may be transitioned from the storage area 808 to the packing station. The transitioning may comprise one or more events 824. Information about the transition may be maintained by the inventory management system 822 using the output data 826 associated with those events 824.

In another example, if the items 804 are departing the facility 802 a list of the items 804 may be obtained and used by the inventory management system 822 to transition responsibility for, or custody of, the items 804 from the facility 802 to another entity. For example, a carrier may accept the items 804 for transport with that carrier accepting responsibility for the items 804 indicated in the list. In another example, a customer may purchase or rent the items 804 and remove the items 804 from the facility 802. The purchase or rental may comprise one or more events 824.

The inventory management system 822 may access or generate sensor data about the facility 802 and the contents therein including the items 804, the users 816, the totes 818, and so forth. The sensor data may be acquired by one or more of the sensors 820, data provided by other systems, and so forth. For example, the sensors 820 may include cameras 820(1) configured to acquire image data of scenes in the facility 802. The image data may comprise still images, video, or a combination thereof. The image data may be processed by the inventory management system 822 to determine a location of the user 816, the tote 818, the identifier of the user 816, and so forth. As used herein, the identity of the user may represent a unique identifier of the user (e.g., name, number associated with user, username, etc.), an identifier that distinguishes the user amongst other users being located within the environment, or the like.

The inventory management system 822, or systems coupled thereto, may be configured to associate an account with the user 816, as well as to determine other candidate users. An account of the user 816 may be determined before, during, or after entry to the facility 802.

In some instances, the inventory management system 822 groups users within the facility into respective sessions. That is, the inventory management system 822 may utilize the sensor data to determine groups of users that are effectively "together" (e.g., shopping together). In some instances, a particular session may include multiple users that entered the facility 802 together and, potentially, that navigate the facility together. For example, when a family of two adults and two children enter the facility together, the inventory management system may associate each user with a particular session. Locating groups in addition to individual users may help in determining the outcome of individual events, given that users within a session may not only individually order, pick, return, or otherwise interact with items, but may also pass the items back and forth amongst each other. For instance, a child in the above example may pick the box of cereal before handing the box to her mother, who may place it in her tote 818. Noting the child and the mother as belonging to the same session may increase the chances of successfully adding the box of cereal to the virtual shopping cart of the mother.

By determining the occurrence of one or more events 824 and the output data 826 associated therewith, the inventory management system 822 is able to provide one or more services to the users 816 of the facility 802. By utilizing one or more facility associates to process inquiry data and generate response data that may then be used to produce output data 826, overall accuracy of the system may be enhanced. The enhanced accuracy may improve the user experience of the one or more users 816 of the facility 802. In some examples, the output data 826 may be transmitted over a network 830 to one or more servers 832 (e.g., remote system(s)).

FIG. 9 illustrates a block diagram of the server(s) 832. The server(s) 832 may be physically present at the facility 802, may be accessible by the network 830, or a combination of both. The server(s) 832 do not require end-user knowledge of the physical location and configuration of the system that delivers the services. Common expressions associated with the server(s) 832 may include "on-demand computing," "software as a service (SaaS)," "cloud services," "data centers," "remote system(s)", and so forth. Services provided by the server(s) 832 may be distributed across one or more physical or virtual devices.

The server(s) 832 may include one or more hardware processors 902 (processors) configured to execute one or more stored instructions. The processor(s) 902 may comprise one or more cores. The server(s) 832 may include one or more input/output (I/O) interfaces 904 to allow the processor 902 or other portions of the server(s) 832 to communicate with other devices. The I/O interface(s) 904 may comprise Inter-Integrated Circuit (I2C), Serial Peripheral Interface bus (SPI), Universal Serial Bus (USB) as promulgated by the USB Implementers Forum, and so forth.

The server(s) 832 may also include one or more communication interfaces 908. The communication interface(s) 908 are configured to provide communications between the server(s) 832 and other devices, such as the sensors 820, the interface devices, routers, the electronic device 832, and so forth. The communication interface(s) 908 may include devices configured to couple to personal area networks (PANs), wired and wireless local area networks (LANs), wired and wireless wide area networks (WANs), and so forth. For example, the communication interface(s) 908 may include devices compatible with Ethernet, Wi-Fi™, and so forth. The server(s) 832 may also include one or more busses or other internal communications hardware or software that allow for the transfer of data between the various modules and components of the servers 832.

The server(s) 832 may also include a power supply 908. The power supply 940 is configured to provide electrical power suitable for operating the components in the server(s) 832.

The server(s) 832 may further include one or more memories 910. The memory 910 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 910 provides storage of computer-readable instructions, data structures, program modules, and other data for the operation of the servers 832. A few example functional modules are shown stored in the memory 910, although the same functionality may alternatively be implemented in hardware, firmware, or as a system on a chip (SOC).

The memory 910 may include at least one operating system (OS) component 912. The OS component 912 is configured to manage hardware resource devices such as the I/O interface(s) 904, the communication interface(s) 908, and provide various services to applications or components executing on the processor(s) 902. The OS component 912 may implement a variant of the FreeBSD™ operating system as promulgated by the FreeBSD Project: other UNIX™ or UNIX-like variants: a variation of the Linux™ operating system as promulgated by Linus Torvalds: the Windows R Server operating system from Microsoft Corporation of Redmond, Washington, USA; and so forth.

One or more of the following components may also be stored in the memory 910. These components may be executed as foreground applications, background tasks, daemons, and so forth. A communication component(s) 914 may be configured to establish communications with one or more of the sensors 820, one or more of the devices used by associates, other server(s) 832, or other devices. The communications may be authenticated, encrypted, and so forth.

The memory 910 may store an inventory management system 916. The inventory management system 916 is configured to provide the inventory functions as described herein with regard to the inventory management system 822. For example, the inventory management system 916 may track movement of items 804 in the facility 802, generate user interface data, and so forth.

The inventory management system 916 may access information stored in one or more data stores 918 in the memory 910. The data store(s) 918 may use a flat file, database, linked list, tree, executable code, script, or other data structure to store the information. In some implementations, the data store(s) 918 or a portion of the data store(s) 918 may be distributed across one or more other devices including other servers 832, network attached storage devices, and so forth.

The data store(s) 918 may include physical layout data 920. The physical layout data 920 provides a mapping of physical locations within the physical layout of devices and objects such as the sensors 820, inventory locations 814, and so forth. The physical layout data 920 may indicate the coordinates within the facility 802 of an inventory location 814, sensors 820 within view of that inventory location 814, and so forth. For example, the physical layout data 920 may include camera data comprising one or more of a location within the facility 802 of a camera 820(1), orientation of the camera 820(1), the operational status, and so forth. Continuing example, the physical layout data 920 may indicate the coordinates of the camera 820(1), pan and tilt information indicative of a direction that the field of view 828 is oriented along, whether the camera 820(1) is operating or malfunctioning, and so forth.

In some implementations, the inventory management system 916 may access the physical layout data 920 to determine if a location associated with the event 824 is within the field of view 828 of one or more sensors 820. Continuing the example above, given the location within the facility 802 of the event 824 and the camera data, the inventory management system 916 may determine the cameras 820(1) that may have generated images of the event 824.

The item data 922 comprises information associated with the items 804. The information may include information indicative of one or more inventory locations 814 at which one or more of the items 804 are stored. The item data 922 may also include order data. SKU or other product identifier, price, quantity on hand, weight, expiration date, images of the item 804, detail description information, ratings, ranking, and so forth. The inventory management system 916 may store information associated with inventory management functions in the item data 922.

The data store(s) 918 may also include sensor data 924. The sensor data 924 comprises information acquired from, or based on, the one or more sensors 820. For example, the sensor data 924 may comprise 3D information about an object in the facility 802. As described above, the sensors 820 may include a camera 820(1), which is configured to acquire one or more images. These images may be stored as the image data 926. The image data 926 may comprise information descriptive of a plurality of picture elements or pixels. Non-image data 928 may comprise information from other sensors 820, such as input from microphones, weight sensors, and so forth.

User data 930 may also be stored in the data store(s) 918. The user data 930 may include identity data, information indicative of a profile, purchase history, location data, and so forth. Individual users 816 or groups of users 816 may selectively provide user data 930 for use by the inventory management system 822. The individual users 816 or groups of users 816 may also authorize collection of the user data 930 during use of the facility 802 or access to user data 930 obtained from other systems. For example, the user 816 may opt-in to collection of the user data 930 to receive enhanced services while using the facility 802.

In some implementations, the user data 930 may include information designating a user 816 for special handling. For example, the user data 930 may indicate that a particular user 816 has been associated with an increased number of errors with respect to output data 826. The inventory management system 916 may be configured to use this information to apply additional scrutiny to the events 824 associated with this user 816. For example, events 824 that include an item 804 having a cost or result above the threshold amount may be provided to a facility associate for processing regardless of the determined level of confidence in the output data 826 as generated by the automated system.

The inventory management system 916 may include one or more of a location component 932, identification component 934, event-determination component 936, and inquiry component 938, potentially amongst other components 956.

The location component 932 functions to locate items or users within the environment of the facility to allow the inventory management system 916 to assign certain events to the correct users. That is, the location component 932 may assign unique identifiers to users as they enter the facility and, with the users' consent, may locate the users throughout the facility 802 over the time they remain in the facility 802. The location component 932 may perform this locating using sensor data 924, such as the image data 926. For example, the location component 932 may receive the image data 926 and may use techniques to identify users from the images. After identifying a particular user within the facility, the location component 932 may then locate the user within the images as the user moves throughout the facility 802. Further, should the location component 932 temporarily "lose" a particular user, the location component 932 may again attempt to identify the users within the facility based on techniques.

Therefore, upon receiving the indication of the time and location of the event in question, the location component 932 may query the data store 918 to determine which one or more users were at or within a threshold distance of the location of the event at the particular time of the event. Further, the location component 932 may assign different confidence levels to different users, with the confidence levels indicating how likely it is that each corresponding user is the user that is in fact associated with the event of interest.

The location component 932 may access the sensor data 924 in order to determine this location data of the user and/or items. The location data provides information indicative of a location of an object, such as the item 804, the user 816, the tote 818, and so forth. The location may be absolute with respect to the facility 802 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 802. 5.2 m from an inventory location 814 along a heading of 169°, and so forth. For example, the location data may indicate that the user 816(1) is 25.2 m along the aisle 812(1) and standing in front of the inventory location 814. In comparison, a relative location may indicate that the user 816(1) is 32 cm from the tote 818 at a heading of 73° with respect to the tote 818. The location data may include orientation information, such as which direction the user 816 is facing. The orientation may be determined by the relative direction the user's 816 body is facing. In some implementations, the orientation may be relative to the interface device. Continuing the example, the location data may indicate that the user 816(1) is oriented with a heading of 0°, or looking north. In another example, the location data may indicate that the user 816 is facing towards the interface device.

The identification component 934 is configured to identify an object. In one implementation, the identification component 934 may be configured to identify an item 804. In another implementation, the identification component 934 may be configured to identify the user 816. For example, the identification component 934 may use facial recognition techniques to process the image data 926 and determine the user 816 depicted in the images by comparing the characteristics in the image data 926 with previously stored results. The identification component 934 may also access data from other sensors 820, such as from an RFID reader, an RF receiver, and so forth.

The event-determination component 936 is configured to process the sensor data 924 and generate output data 826, and may include components described above. The event-determination component 936 may access information stored in the data store(s) 918 including, but not limited to, event-description data 942, confidence levels 944, or threshold values 946. In some instances, the event-determination component 936 may be configured to perform some or all of the techniques described above with regards to the event-determination component 936. For instance, the event-determination component 936 may be configured to create and utilize event classifiers for identifying events (e.g., predefined activity) within image data, potentially without use of other sensor data acquired by other sensors in the environment.

The event-description data 942 comprises information indicative of one or more events 824. For example, the event-description data 942 may comprise predefined profiles that designate movement of an item 804 from an inventory location 814 with the event 824 of "pick". The event-description data 942 may be manually generated or automatically generated. The event-description data 942 may include data indicative of triggers associated with events occurring in the facility 802. An event may be determined as occurring upon detection of the trigger. For example, sensor data 924 such as a change in weight from a weight sensor 820 at an inventory location 814 may trigger detection of an event of an item 804 being added or removed from the inventory location 814. In another example, the trigger may comprise an image of the user 816 reaching a hand toward the inventory location 814. In yet another example, the trigger may comprise two or more users 816 approaching to within a threshold distance of one another.

The event-determination component 936 may process the sensor data 924 using one or more techniques including, but not limited to, artificial neural networks, classifiers, decision trees, support vector machines, Bayesian networks, and so forth. For example, the event-determination component 936 may use a decision tree to determine occurrence of the "pick" event 824 based on sensor data 924. The event-determination component 936 may further use the sensor data 924 to determine one or more tentative results 948. The one or more tentative results 948 comprise data associated with the event 824. For example, where the event 824 comprises a disambiguation of users 816, the tentative results 948 may comprise a list of possible user 816 identities. In another example, where the event 824 comprises a disambiguation between items, the tentative results 948 may comprise a list of possible item identifiers. In some implementations, the tentative result 948 may indicate the possible action. For example, the action may comprise the user 816 picking, placing, moving an item 804, damaging an item 804, providing gestural input, and so forth.

In some implementations, the tentative results 948 may be generated by other components. For example, the tentative results 948 such as one or more possible identities or locations of the user 816 involved in the event 824 may be generated by the location component 932. In another example, the tentative results 948 such as possible items 804 that may have been involved in the event 824 may be generated by the identification component 934.

The event-determination component 936 may be configured to provide a confidence level 944 associated with the determination of the tentative results 948. The confidence level 944 provides indicia as to the expected level of accuracy of the tentative result 948. For example, a low confidence level 944 may indicate that the tentative result 948 has a low probability of corresponding to the actual circumstances of the event 824. In comparison, a high confidence level 944 may indicate that the tentative result 948 has a high probability of corresponding to the actual circumstances of the event 824.

In some implementations, the tentative results 948 having confidence levels 944 that exceed the threshold may be deemed to be sufficiently accurate and thus may be used as the output data 826. For example, the event-determination component 936 may provide tentative results 948 indicative of the three possible items 804(1), 804(2), and 804(3) corresponding to the "pick" event 824. The confidence levels 944 associated with the possible items 804(1), 804(2), and 804(3) may be 25%, 70%, 92%, respectively. Continuing the example, the threshold value 946 may be set such that confidence level 944 of 90% are deemed to be sufficiently accurate. As a result, the event-determination component 936 may designate the "pick" event 824 as involving item 804(3).

The inquiry component 938 may be configured to use at least a portion of the sensor data 924 associated with the event 824 to generate inquiry data 950. In some implementations, the inquiry data 950 may include one or more of the tentative results 948 or supplemental data 952. The inquiry component 938 may be configured to provide inquiry data 950 to one or more devices associated with one or more human associates.

An associate user interface is presented on the respective devices of associates. The associate may generate response data 954 by selecting a particular tentative result 948, entering new information, indicating that they are unable to answer the inquiry, and so forth.

The supplemental data 952 comprises information associated with the event 824 or that may be useful in interpreting the sensor data 924. For example, the supplemental data 952 may comprise previously stored images of the items 804. In another example, the supplemental data 952 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 926 during presentation to an associate.

The inquiry component 938 processes the response data 954 provided by the one or more associates. The processing may include calculating one or more statistical results associated with the response data 954. For example, statistical results may include a count of the number of times associates selected a particular tentative result 948, determination of a percentage of the associates that selected a particular tentative result 948, and so forth.

The inquiry component 938 is configured to generate the output data 826 based at least in part on the response data 954. For example, given that a majority of the associates returned response data 954 indicating that the item 804 associated with the "pick" event 824 is item 804(5), the output data 826 may indicate that the item 804(5) was picked.

The inquiry component 938 may be configured to selectively distribute inquiries to particular associates. For example, some associates may be better suited to answering particular types of inquiries. Performance data, such as statistical data about the performance of the associates, may be determined by the inquiry component 938 from the response data 954 provided by the associates. For example, information indicative of a percentage of different inquiries in which the particular associate selected response data 954 that disagreed with the majority of associates may be maintained. In some implementations, test or practice inquiry data 950 having a previously known correct answer may be provided to the associate for training or quality assurance purposes. The determination of the set of associates to use may be based at least in part on the performance data.

By using the inquiry component 938, the event-determination component 936 may be able to provide high reliability output data 826 that accurately represents the event 824. The output data 826 generated by the inquiry component 938 from the response data 954 may also be used to further train the automated systems used by the inventory management system 916. For example, the sensor data 924 and the output data 826, based on response data 954, may be provided to one or more of the components of the inventory management system 916 for training in process improvement. Continuing the example, this information may be provided to an artificial neural network, Bayesian network, and so forth, to further train these systems such that the confidence level 944 and the tentative results 948 produced in the future for the same or similar input is improved. Finally, as FIG. 9 illustrates, the server(s) 832 may store and/or utilize other data 958.

As further shown in the example of FIG. 9, the inventory management system 916 may include a determination component 960 (which may represent, and/or include, the determination component 306). As described herein, the inventory management system 916 may use the determination component 960 in order to identify interactions and/or events associated with the facility 802. To identify the interactions and/or events, the determination component 960 may generate and/or processes at least feature data 962, heatmap data 964, input data 966, inventory data 968, and/or any other type of data.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system comprising:
one or more processors; and
one or more computer-readable media storing instructions that, when executed by the one or more processors, cause the one or more processors to perform operations comprising:
    storing inventory data indicating that:
        a first bin is associated with a first item type; and
        a second bin is associated with a second item type;
    receiving image data generated by a camera, the image data representing a user interacting with an inventory location that includes the first bin and the second bin;
    generating first heatmap data representing the first bin of the inventory location, the first heatmap data associated with a first portion of the image data that represents the first bin;
    generating second heatmap data representing the second bin of the inventory location, the second heatmap data associated with a second portion of the image data that represents the second bin;
    generating, using the image data, feature data associated with the user, the feature data indicating at least a third portion of the image data that represents at least one of an arm or a hand of the user;
    determining, based at least in part on the first heatmap data and the feature data, that the third portion of the image data includes the first portion of the image data;
    determining that the first bin is active based at least in part on the third portion of the image data including the first portion of the image data;
    based at least in part on the first bin being active, analyzing the first portion of the image data in order to identify an event, the event including the user removing an item from the first bin;
    determining, using the inventory data, that the item includes the first item type; and
    generating event data associated with the event, the event data indicating at least an event type and the first item type.

2. The system as recited in claim 1, wherein the image data is first image data, the user is a first user, and the feature data is first feature data, and wherein the operations further comprise:
    receiving second image data generated by one or more cameras, the second image data representing a second user interacting with a third bin;
    processing the second image data in order to generate second feature data, the second feature data indicating at least:
        a first portion of the second image data that represents the third bin; and
        a second portion of the second image data that represents at least one of an arm or a hand of the second user; and
    inputting the second features data into an interaction-detection component in order to train the interaction-detection component,
    and wherein the system determines that the third portion of the first image data includes the first portion of the first image data using the interaction-detection component.

3. The system as recited in claim 1, wherein the feature data further indicates that a fourth portion of the image data represents at least one of the arm or the hand of the user, and wherein the operations further comprise:
    determining, based at least in part on the second heatmap data and the feature data, that the fourth portion of the image data includes the second portion of the image data;
    determining that the second bin is also active based at least in part on the fourth portion of the image data including the second portion of the image data; and
    based at least in part on the second bin being active, analyzing the second portion of the image data.

4. A method comprising:
    receiving image data generated by a camera, the image data representing at least a first inventory location;
    generating first heatmap data indicating a first portion of the image data, the first portion of the image data corresponding to at least a portion of the first inventory location;
    generating first data indicating a second portion of the image data, the second portion of the image data representing a first user;
    determining that the first heatmap data corresponds to the first data;
    identifying, based at least in part on the first heatmap data corresponding to the first data, a first interaction with the first inventory location;
    based at least in part on identifying the first interaction, analyzing the first portion of the image data to detect a first event associated with the first inventory location;
    generating second heatmap data indicating third portion of the image data, the third portion of the image data corresponding to at least a portion of a second inventory location;
    generating second data indicating a fourth portion of the image data, the fourth portion of the image data also representing a second user;
    determining that the second heatmap data corresponds to the second data;
    identifying, based at least in part on the second heatmap data corresponding to the second data, a second interaction with the second inventory location; and
    based at least in part on identifying the second interaction, analyzing the third portion of the image data to detect a second event associated with the second inventory location.

5. The method as recited in claim 4, wherein:
    the first portion of the image data corresponds to first pixels represented by the image data;
    the second portion of the image data corresponds to second pixels represented by the image data; and
    determining that the first heatmap data corresponds to the first data comprises at least analyzing the first heatmap data with respect to the first data to determine that the first pixels include the second pixels.

6. The method as recited in claim 4, further comprising:
    analyzing the image data to determine one or more characteristics associated with the first inventory location; and determining that the first portion of the image data represents the portion of the first inventory location based at least in part on the one or more characteristics, and wherein generating the first heatmap data is based at least in part on the first portion of the image data representing the portion of the first inventory location.

7. The method as recited in claim 4, further comprising:

receiving, from an electronic device, input data indicating that the first portion of the image data represents the portion of the first inventory location, and wherein generating the first heatmap data is based at least in part on the input data.

8. The method as recited in claim 4, further comprising:

analyzing the image data to determine that the first portion of the image data represents one or more items located at the first inventory location; and determining that the one or more items includes an item type;

and wherein generating the first heatmap data is based at least in part on the first portion of the image data representing the one or more items that include the item type.

9. The method as recited in claim 4, further comprising:

based at least in part on the interaction with the first inventory location, determining that the first inventory location is active, and wherein analyzing the first portion of the image data is based at least in part on the first inventory location being active.

10. The method as recited in claim 4 further comprising:

determining an event type associated with the first event, the event type including at least one of:
  a removal of an item from the inventory location
  a return of the item to the inventory location; or
  a rummaging associated with the inventory location; and generating third data representing the event type.

11. The method as recited in claim 4, further comprising:

storing second data representing an item type associated with the first inventory location;

determining that the first event is associated with the item type based at least in part on the second data; and generating third data representing the item type.

12. The method as recited in claim 4, further comprising:

storing second data that associates the first heatmap data with an item type;

determining that the first event is associated with the item type based at least in part on the second data; and generating third data representing the item type.

13. The method as recited in claim 4, wherein the method further comprises:

generating second heatmap data indicating third portion of the image data, the third portion of the image data corresponding to at least a portion of a second inventory location;

generating second data indicating a fourth portion of the image data, the fourth portion of the image data representing the second user;

determining that the second heatmap data corresponds to the second data;

identifying, based at least in part on the second heatmap data corresponding to the second data, a second interaction with the second inventory location; and based at least in part on identifying the second interaction, analyzing the third portion of the image data to detect a second event associated with the second inventory location.

14. The method as recited in claim 4, wherein the image data represents a video, and wherein the method further comprises:

determining a period of time that the first heatmap data corresponds to the first data;

determining that the first interaction occurred during the period of time; and generating third data representing the period of time.

15. The method as recited in claim 4, wherein the method further comprises:

receiving second image data generated by one or more cameras, the second image data representing a second inventory location;

processing the second image data in order to generate second data, the second data indicating at least:
  a first portion of the second image data that represents the second inventory location; and
  a second portion of the second image data that represents the second user; and inputting the second data into an interaction-detection component in order to train the interaction-detection component, and wherein the interaction-detection component determines that the heatmap data corresponds to the first data.

16. The method as recited in claim 4, further comprising:

determining that the first event occurred associated with the first inventory location, the first event including at least a removal of an item from the first inventory location; and generating third data that associates an identifier of the item with an account associated with the first user.

17. The method as recited in claim 4, wherein the first user is different from the second user.

18. A system comprising:

one or more processors; and one or more computer-readable media storing instructions that, when executed by the one or more processors, cause the one or more processors to perform operations comprising:

receiving first image data generated by a first camera, the first image data representing a first user interacting with a first inventory location;

determining that a first portion of the first image data represents the first inventory location;

determining that a second portion of the first image data represents a portion of the first user that is interacting with the first inventory location;

generating first data, the first data indicating that:
  the first portion of the first image data represents the first inventory location; and
  the second portion of the first image data represents the portion of the first user;

inputting the first data into an interaction-detection component in order to train the interaction-detection component;

receiving second image data generated by a second camera, the second image data representing at least a second inventory location;

generating heatmap data indicating a first portion of the second image data, the first portion of the second image data corresponding to at least a portion of the second inventory location;

generating second data indicating a second portion of the second image data, the second portion of the second image data representing a second user;

determining, using the interaction-detection component, an interaction with the second inventory location; and based at least in part on determining the interaction, analyzing the first portion of the second image data to detect an event associated with the second inventory location.

19. The system as recited in claim 18, the operations further comprising:

determining that the first image data represents an event type associated with the interaction;

generating third data representing the event type; and inputting the third data into the interaction-detection component.

20. The system as recited in claim 18, the operations further comprising:

determining that the event occurred associated with the second inventory location, the event including at least a removal of an item from the second inventory location; and generating third data that associates an identifier of the item with an account associated with the user.

21. The system as recited in claim 18, the operations further comprising:

receiving, from an electronic device, first input data indicating that the first portion of the first image data represents the portion of the first inventory location; and receiving, from an electronic device, second input data indication that the second portion of the first image data represents the portion of the first user.

* * * * *